US012561180B2

(12) United States Patent
Wilson et al.

(10) Patent No.: US 12,561,180 B2
(45) Date of Patent: Feb. 24, 2026

(54) SYSTEM AND METHOD FOR SUBSCRIPTION MANAGEMENT BY INSTANTIATING AND/OR RETIRING COMPOSED SYSTEMS OF A MANAGED SYSTEM

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1033 days.

(21) Appl. No.: 17/570,709

(22) Filed: Jan. 7, 2022

(65) Prior Publication Data

US 2023/0221997 A1     Jul. 13, 2023

(51) Int. Cl.
*G06F 9/46* (2006.01)
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/45562* (2013.01); *G06F 2009/45579* (2013.01); *G06F 2209/501* (2013.01)

(58) Field of Classification Search
None
See application file for complete search history.

(56) References Cited

U.S. PATENT DOCUMENTS

| | | | |
|---|---|---|---|
| 6,317,815 | B1 | 11/2001 | Mayer et al. |
| 6,421,727 | B1 | 7/2002 | Reifer et al. |
| 7,464,163 | B1 | 12/2008 | Bantz et al. |
| 7,647,392 | B2 | 1/2010 | Sharma et al. |

(Continued)

OTHER PUBLICATIONS

Souvik Chakravarty (2019). Arm System Control Processor (SCP) Firmware-101. Linaro. https://static.linaro.org/connect/san19/presentations/san19-117.pdf.

(Continued)

*Primary Examiner* — Bing Zhao
(74) *Attorney, Agent, or Firm* — WOMBLE BOND DICKINSON (US) LLP

(57)     ABSTRACT

Methods, systems, and devices for providing computer implemented services using managed systems are disclosed. To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services. To improve the likelihood of the computer implemented services being provided, the managed systems may be managed using a subscription based model. The subscription model may utilize a highly accessible service to obtain information regarding desired capabilities (e.g., a subscription) of a managed system, and use the acquired information to automatically instantiate and/or retire composed systems to manage resources presentation and/or use.

20 Claims, 18 Drawing Sheets

(56) References Cited

U.S. PATENT DOCUMENTS

| | | | |
|---|---|---|---|
| 9,178,948 | B2 | 11/2015 | Chen et al. |
| 9,529,602 | B1 | 12/2016 | Swierk et al. |
| 9,705,995 | B2 | 7/2017 | Edlund et al. |
| 10,031,763 | B1 | 7/2018 | Siebenthaler |
| 10,044,522 | B1 | 8/2018 | Shamis et al. |
| 10,262,309 | B1 | 4/2019 | Chan et al. |
| 11,397,823 | B1 | 7/2022 | Argenti |
| 11,449,354 | B2 * | 9/2022 | Fu .......................... G06F 9/5072 |
| 11,588,909 | B1 | 2/2023 | Wilson et al. |
| 11,632,315 | B1 | 4/2023 | Sawal et al. |
| 11,671,379 | B1 | 6/2023 | Wilson et al. |
| 11,803,667 | B2 | 10/2023 | Singh et al. |
| 2003/0131028 | A1 | 7/2003 | Radi et al. |
| 2003/0149813 | A1 * | 8/2003 | Bouchet .................... G06F 9/46 |
| | | | 710/38 |
| 2005/0122900 | A1 | 6/2005 | Tuulos et al. |
| 2005/0182843 | A1 | 8/2005 | Reistad et al. |
| 2006/0010477 | A1 | 1/2006 | Yu |
| 2006/0136747 | A1 | 6/2006 | Ahdout et al. |
| 2007/0091862 | A1 | 4/2007 | Ioannidis |
| 2007/0214193 | A1 | 9/2007 | Takahashi et al. |
| 2008/0215796 | A1 | 9/2008 | Lam et al. |
| 2008/0235784 | A1 | 9/2008 | Basner et al. |
| 2008/0256641 | A1 | 10/2008 | Lo |
| 2009/0077407 | A1 | 3/2009 | Akimoto |
| 2011/0225574 | A1 | 9/2011 | Khalidi et al. |
| 2012/0005649 | A1 | 1/2012 | Lavin |
| 2012/0042388 | A1 | 2/2012 | Rive et al. |
| 2012/0076131 | A1 | 3/2012 | Bianconi |
| 2012/0144177 | A1 | 6/2012 | Tyigun et al. |
| 2012/0311111 | A1 * | 12/2012 | Frew .................... G06F 9/5072 |
| | | | 709/221 |
| 2012/0311673 | A1 | 12/2012 | Sodah |
| 2013/0007437 | A1 | 1/2013 | Shroni et al. |
| 2013/0198346 | A1 | 8/2013 | Jubran et al. |
| 2013/0283298 | A1 | 10/2013 | Ali et al. |
| 2013/0339306 | A1 | 12/2013 | Kim et al. |
| 2013/0347025 | A1 | 12/2013 | Prakash et al. |
| 2014/0074793 | A1 | 3/2014 | Doering et al. |
| 2015/0005033 | A1 | 1/2015 | Petersson et al. |
| 2015/0271276 | A1 | 9/2015 | Edlund et al. |
| 2015/0278323 | A1 | 10/2015 | Melahn et al. |
| 2015/0373012 | A1 | 12/2015 | Bartz |
| 2016/0150396 | A1 | 5/2016 | Milhizer |
| 2016/0188868 | A1 | 6/2016 | Otturu et al. |
| 2016/0231804 | A1 | 8/2016 | Bulusu et al. |
| 2017/0006119 | A1 | 1/2017 | Pogrebinsky et al. |
| 2017/0048713 | A1 | 2/2017 | Guday et al. |
| 2017/0090912 | A1 | 3/2017 | Fuglsang et al. |
| 2017/0244783 | A1 | 8/2017 | Maresca |
| 2017/0359356 | A1 | 12/2017 | Brandwine |
| 2019/0018715 | A1 | 1/2019 | Behrendt et al. |
| 2019/0044793 | A1 | 2/2019 | Chew |
| 2021/0067406 | A1 | 3/2021 | Myers et al. |
| 2021/0160255 | A1 | 5/2021 | Cherkas et al. |
| 2021/0342173 | A1 | 11/2021 | Tsirkin |
| 2021/0360074 | A1 | 11/2021 | Long |
| 2022/0164838 | A1 | 5/2022 | Wang |
| 2022/0200928 | A1 | 6/2022 | Garrison et al. |
| 2023/0171586 | A1 | 6/2023 | Holmes |
| 2023/0221784 | A1 | 7/2023 | Wilson et al. |
| 2023/0222080 | A1 | 7/2023 | Wilson et al. |
| 2023/0222468 | A1 | 7/2023 | Wilson et al. |
| 2023/0222469 | A1 | 7/2023 | Wilson et al. |
| 2023/0222470 | A1 | 7/2023 | Wilson et al. |
| 2023/0222471 | A1 | 7/2023 | Wilson et al. |
| 2023/0224216 | A1 | 7/2023 | Wilson et al. |
| 2023/0229512 | A1 | 7/2023 | Sawal et al. |
| 2023/0229516 | A1 | 7/2023 | Sawal et al. |
| 2023/0229818 | A1 | 7/2023 | Sawal et al. |
| 2023/0232549 | A1 | 7/2023 | Sawal et al. |
| 2023/0342787 | A1 | 10/2023 | Mohanty et al. |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

SYSTEM AND METHOD FOR SUBSCRIPTION MANAGEMENT BY INSTANTIATING AND/OR RETIRING COMPOSED SYSTEMS OF A MANAGED SYSTEM

FIELD DISCLOSED HEREIN

Embodiments disclosed herein relate generally to system management. More particularly, embodiments disclosed herein relate to systems and methods to manage systems through hardware enablement and disablement.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
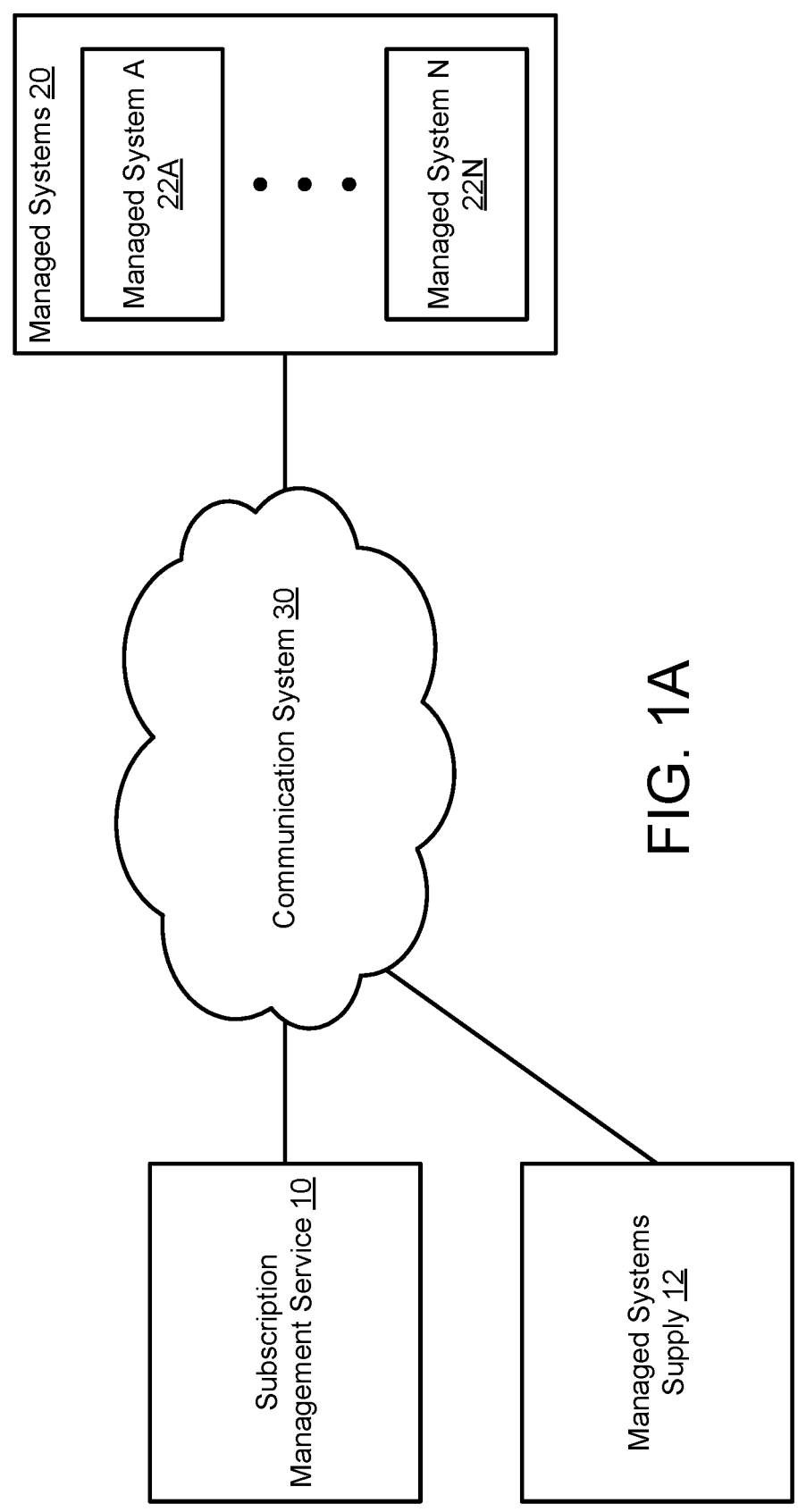
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services.

To improve the likelihood of the computer implemented services being provided, embodiments disclosed here relate to methods and systems for managing managed systems using a subscription based model. The subscription model may utilize a highly accessible service to obtain information regarding desired capabilities (e.g., a subscription) of a managed system, and use the acquired information to automatically configure and manage the features and capabilities of managed systems to meet those desired by users, operators, and/or other persons.

Additionally, the subscription model may provide for the automatic removal and/or disablement of functions and/or capabilities upon subscription limits being exceeded. The managed systems may host local subscription managers that include functionality to automatically enable and disable various components, to add and/or remove various software components, and/or otherwise manage the operation of the host devices. Consequently, the managed system may automatically be placed into compliance with subscriptions by the local subscription managers even under challenging circumstances such as, for example, limited and/or no communications with the subscription management service.

In an embodiment, the managed systems are managed by selectively instantiating and/or retiring a composed system. A composed system may be an entity formed from one or more hardware resources units. The hardware resources units of a composed system may operate as though they are connected to one another as bare metal resources. However, the connectivity between the hardware resource units may actually be mediated by one or more controllers which may provide any number of layers of resource abstraction (e.g., virtualization, translation, etc.). The controllers may communicate with one another (e.g., not as bare metal entities) to present interfaces to the hardware resource units that appear, to the hardware resources units, to be bare metal interfaces to the other hardware resources units. The controller may allow for any number of such hardware resources units to operate as though they are interconnected via bare metal interfaces. Accordingly, no overhead may be incurred, on the part of the hardware resource units, for participating in the composed systems.

In an embodiment, only hardware resource units of composed systems are presented to users of a managed system. Hardware resource units not allocated to a composed system may not be accessible or otherwise usable by users of the managed system. In this manner, the users of the managed systems may be dynamically provided with varying levels of resources, capabilities, etc. in accordance with their respective subscriptions thereby allowing the users to manage their use of the managed systems.

In an embodiment, a computer-implemented method for operating a managed system is provided. The method may include obtaining, by a local subscription manager of the managed system, a subscription update for the managed system; making a determination that the subscription update is a valid subscription update; in response to the determination: updating, by the local subscription manager, a subscription information repository based on the subscription update to obtain an updated subscription information repository, the subscription information repository specifying composed systems to be provided to a user of the managed system; and enforcing, by the local subscription manager, the updated subscription information repository on the managed system to present at least one new composed system to the user of the managed system using a portion of composable resources of the managed system.

Enforcing the updated subscription information repository may include initiating selection of one or more hardware resource units based on the updating of the subscription information repository; instantiating the new composed system using one or more controllers associated with the one or more hardware resource units; initiating operation of the new composed system; and presenting the operation of the new composed system to the user of the managed system.

Instantiating the new composed system using the one or more controllers may include presenting, using a first controller of the one or more controllers, a first hardware resource unit of the one or more hardware resource units as bare metal resources to a second hardware resource unit of the one or more hardware resource units. The first hardware resource unit and the second hardware resource unit may be operably connected via a communication fabric.

Presenting the first hardware resource unit as the bare metal resources may include instantiating, using the first controller, a virtualization layer for the first hardware resource unit; allocating, using the first controller, a portion of computing resources of the first hardware resource unit to the second hardware resource unit; establishing, using the first controller and a second controller, a communication link between the first hardware resource unit and the second hardware resource unit; and presenting, using the second controller and the communication link, a synthetic bare metal interface for the first hardware resource unit to the second hardware resource unit.

The composable resources may be arranged in hardware resources unit, and presentation of each of the hardware resources unit may be mediated by a controller. The controller may be operably connected to other hardware resources units via a fabric.

The controller may be adapted to present the hardware resources unit as bare metal resources to the other hardware resources units.

The local subscription manager may enforce the updated subscription information repository by initiating transmission of one or more communications to the controller and/or other controllers associated with the other hardware resources, wherein the one or more communications are directed to unallocated portions of the composable resources.

A first hardware resource unit of the other hardware resource unit is a compute unit and a second hardware resource unit of the other hardware resource unit is a storage unit. One of the first hardware resource unit and the second hardware resource unit are selected as a portion of computing resources for allocation to the at least one new composed system based on a unit type of the hardware resource unit to provide both compute computing resources and storage computing resources to the at least one new composed system.

The local subscription manager may include an out of band management controller for the managed system, the out of band management controller operating independent from the managed system and being hosted by the managed system. The subscription information repository may be stored in a location accessible to the out of band management controller and inaccessible to the managed system.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
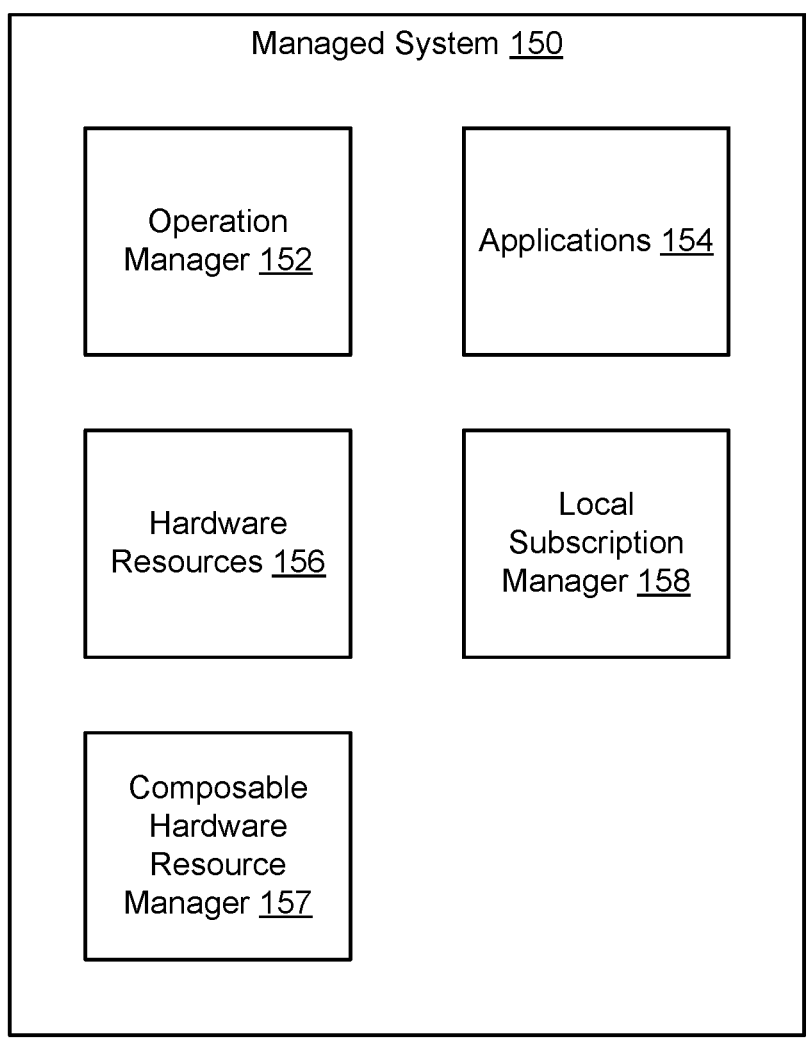
FIG. 1B shows a block diagram illustrating a managed system in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components and/or applications may need to be implemented by managed systems 20 depending on the computer implemented services desired to be provided by the respective managed systems. Refer to FIG. 1B for additional details regarding managed systems 20.

However, determining these configurations of hardware and/or software components (e.g., applications) necessary for corresponding computer implemented services may be technically challenging to identify. For example, a person may need to be familiar with a range of hardware and software components issues to effectively select the hardware components and/or software components of a system so that the system is capable of providing the desired computer implemented services. Further, if a system is procured that lacks necessary hardware and/or software components, the procured system may not be able to provide its desired functions.

In general, embodiments disclosed herein relate to system, devices and methods for managing one or more managed systems in a manner that may improve the likelihood of the managed system being able to provide desired computer implemented services over time. To do so, a system in accordance with embodiments disclosed herein may provide a distributed system for automatically identifying and implementing hardware and/or software configurations of managed systems (e.g., to provide an integrated solution). By doing so, embodiments disclosed herein may (i) reduce the cognitive burden for selecting and managing systems to provide desired computer implemented services, (ii) may improve the uptime of desired computer implemented services by making it more likely that managed systems are able to provide the desired services over time, and/or (iii) reducing the cost of obtaining desired computer implemented services by dynamically enabling and/or disabling only those functions/components (which may have associated cost for such functions) necessary to provide the desired computer implemented services.

To provide the above noted functionality, a system in accordance with an embodiment may include subscription management service 10. Subscription management service 10 may facilitate (i) selection and procurement of managed systems to a client site (e.g., a deployment location), and (ii) automatic configuration of managed systems 20 to provide an integrated solution. To do so, subscription management service 10 may (i) obtain information indicating desired functions of one or more of managed systems 20 and/or hardware components of managed systems 20 to be enabled and/or disabled (and/or information indicating corresponding periods of time of enablement/disablement of hardware/ software components), (ii) select and deploy one or more managed systems 20 to a client site, (iii) correlate the desired functions with various hardware components (e.g., if explicit hardware components identifications are not made), aggregations such as hosts, and/or other entities formed from collections of hardware and/or software components, and (iv) provide local subscription managers hosted by managed systems 20 with information regarding the identified hardware and/or software components, periods of enablement/disablement, and/or other information to allow the local subscription managers to configure managed systems 20 in a manner that conforms to the information (e.g., subscriptions) obtained by subscription management service 10. In this manner, a user or manager of managed systems 20 may obtain and configure managed systems 20 without needing to directly know specific capabilities of potential managed systems and/or interact with the various hardware and/or software components of managed systems 20 once deployed to a client site.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made, for example, on the basis that the requesting entity may be likely to request additional features and/or capabilities in the future (or on other basis or combination of basis). Consequently, managed systems 20, when deployed to a client site, may include sufficient hardware components to address a range of different use cases and solution, beyond those that may be immediately apparent to a requesting entity (e.g., a persons, administrator, etc. that may use or be tasked with managing various computing resources). The additional capabilities may take the form of, for example, additional processors, memory modules, storage devices, graphical processing units, network interface devices, and/or other types of hardware components.

The distributed system may allow a provider of managed systems 20 to selectively manage various functionalities provided by managed systems 20. By doing so, a provider of managed systems 20 may tailor the functions provided by managed systems 20 (e.g., from all possible functions) to only those requested, desired, and/or procured by an operator, manager, and/or user of managed systems 20. For example, the distributed system may include functionality to compose various hosts using combinations of computing resources (e.g., hardware components, software hosted by the hardware components, etc.). In this manner, the additional capabilities not requested by a requesting entity may be disabled from use by a user of managed systems 20, until such time as the requesting entity adds or otherwise changes subscriptions such that the additional capabilities are to be afforded to the users of managed systems 20. Changes to the subscriptions may cause various composed systems to be instantiated and/or retired, such that users of the managed systems are only provided with corresponding resources to which they are subscribed.

For example, consider a scenario where a provider of a managed system does so on a contractual basis where a user of the managed system agrees to purchase subscriptions for various functionalities, hardware components, and/or software components. The user may use subscription management service 10 to select to which of the aforementioned features the user wishes to have enabled, to the extent of such enablement, durations of enablement, etc. After an initial selection leading to deployment of managed systems 20 with additional capabilities beyond those usable by the user, the user may expand their subscription to allow for use of these additional capabilities. In response, subscription management service 10 may cooperate with local subscription managers hosted by managed systems 20 to reconfigure the operation of managed systems 20 to allow these additional features to be utilized by the users. For example, various inactive hardware components may be composed to establish new composed systems usable by users of the managed systems 20. Consequently, the underlying hardware of managed systems 20 may not need to be changed to allow for various capabilities of managed systems 20 available to user to be expanded, or contracted, depending on whether a corresponding subscription is expanded, or contracted.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client/user devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems 20 even when, for example, one or more of the local subscription managers are unable to communicate with subscription management service 10 (e.g., after receiving the subscription management information).

Any of subscription management service 10 and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

In an embodiment, one or more of subscription management service 10, managed systems supply 12, and managed systems 20 are operably connected via communication system 30. Communication system 30 may allow any of subscription management service 10, managed systems supply 12, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 6), a public network, and/or may include the Internet. For example, managed systems 20 may be operably connected to subscription management service 10 via the Internet. Subscription management service 10, managed systems supply 12, managed systems 20, and/or communication system 30 may be adapted to perform one or more protocols for communicating via communication system 30.

While illustrated in FIG. 1 with a limited number of specific components, a system may include additional, fewer, and/or different components without departing from embodiments disclosed herein.

Turning to FIG. 1B, a block diagram illustrating managed system 150 in accordance with an embodiment is shown. Managed system 150 may be similar to any of managed systems 20 shown in FIG. 1A. Managed system 150 may provide desired computer implemented service by allowing for its automatic reconfiguration over time based on subscriptions maintained by subscription management service 10, shown in FIG. 1A.

Figure 6:
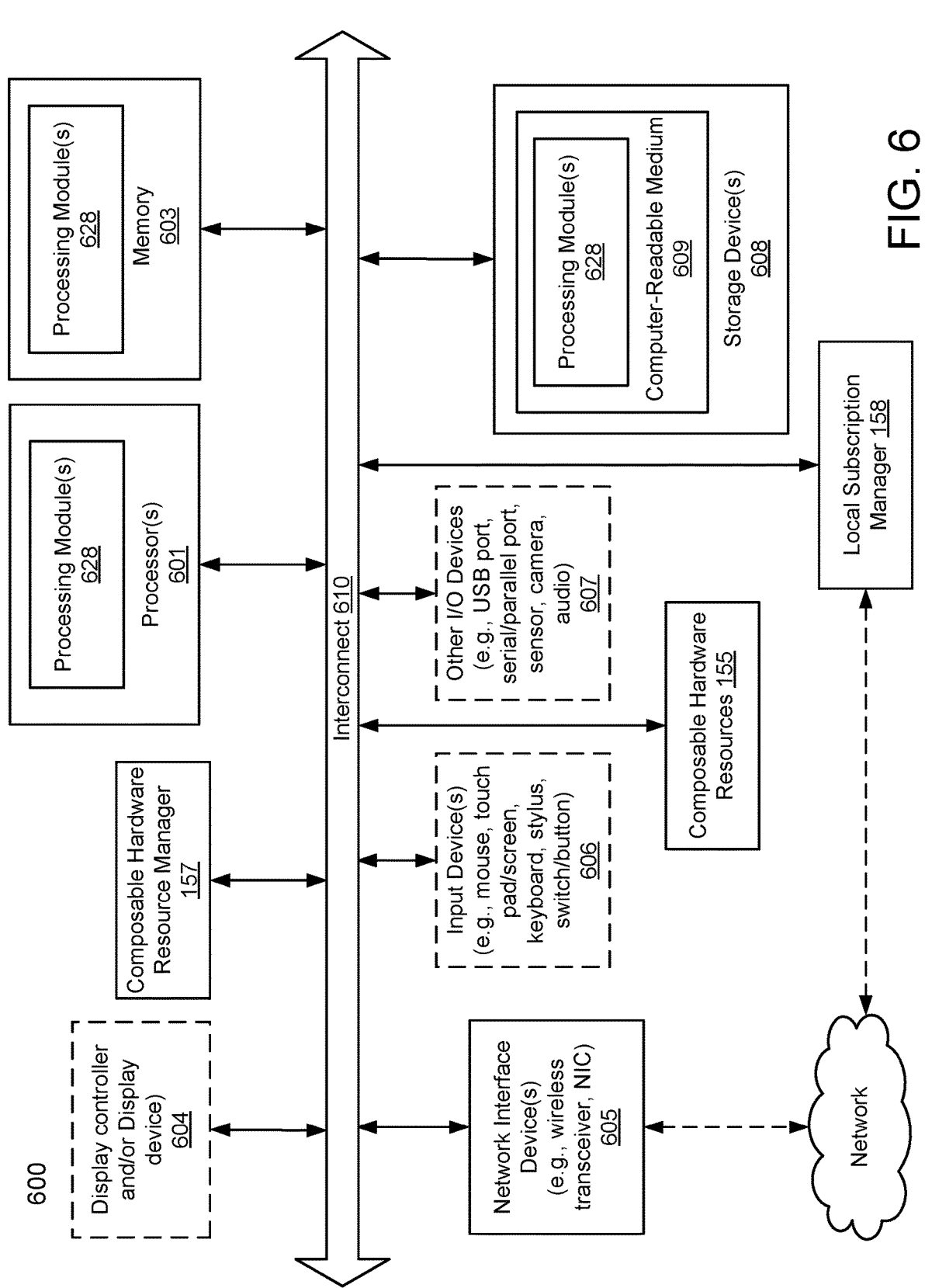
FIG. 6 shows a block diagram illustrating a computing device in accordance with an embodiment.

In addition (and/or alternatively) to any of the components shown in FIG. 6, managed system 150 may include operation manager 152, applications 154, hardware resources 156, composable hardware resource manager 157, and local subscription manager 158. Each of these components is discussed below.

Operation manager 152 may generally manage operation of the component of managed system 150, except for local subscription manager 158. For example, operation manager 152 may be implemented with one or more operating systems used to manage hardware resources 156, or portions thereof, of managed system 150 to facilitate execution of applications 154. Operation manager 152 may also include, for example, a startup manager such as a basic input output system (BIOS) used to prepare managed system 150 to boot various portions of hardware resources 156 to one or more operating systems, or other types of operation management entities. For example, the startup manager may perform various administrative functions such as (i) identifying the hardware resource 156 and (ii) preparing the hardware resources 156 for use. Once prepared, the startup manager may handoff management of managed system 150 to the one or more operating systems or other type of management entity to place managed system 150 in a predetermined operating system conducive to applications 154 providing their functionalities. Prior to hand off, managed system 150 may not be in an operating state in which applications 154 may provide all, or a portion, of their functionalities.

Applications 154 may provide all, or a portion, of the computer implemented services desired by a user, operator, or other person associated with managed system 150. Applications 154 may utilize hardware resources 156 to provide their respective functionalities. Various portions of applications 154 may utilize corresponding portions of hardware resources 156 (some portions may be shared). Operation manager 152 may mediate presentation of hardware resources 156 by, for example, scheduling use, managing discontinuous access, and/or performing other actions to coordinate use of hardware resources 156 by applications 154 (and/or other entities).

For example, operation manager 152 may include one or more operating systems hosted by and that manage corresponding portions of hardware resources 156 (e.g., "composed systems"). Each of the composed systems may host one or more of applications 154 thereby allowing applications 154 to provide their respective functionalities. As will be discussed below, local subscription manager 158 and composable hardware resource manager 157 may cooperatively manage instantiation, operation, and/or retirement of composed systems in accordance with subscriptions associated with managed system 150.

In an embodiment, one or more of operation manager 152 and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 152 and applications 154. One or more of operation manager 152 and applications 154 may be implemented using other types of hardware devices without departing embodiment disclosed herein.

In an embodiment, one or more of operation manager 152 and applications 154 is implemented using a processor adapted to execute computing code stored on a persistent storage that when executed by the processor performs the functionality of one or more of operation manager 152 and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of operation manager 152, applications 154, and/or other entities not shown in FIG. 1B. As part of their respective operation, hardware resources 156 may host firmware and/or may otherwise be programmable to facilitate their respective operation.

Figure 1C:
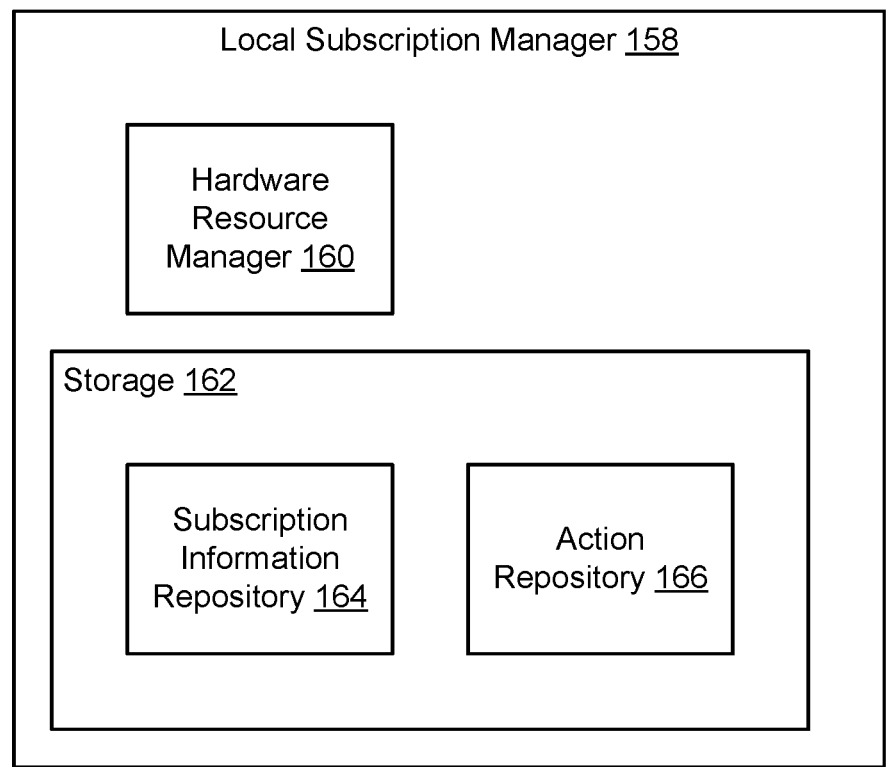
FIG. 1C shows a block diagram illustrating a local subscription manager in accordance with an embodiment.
Figure 1D:
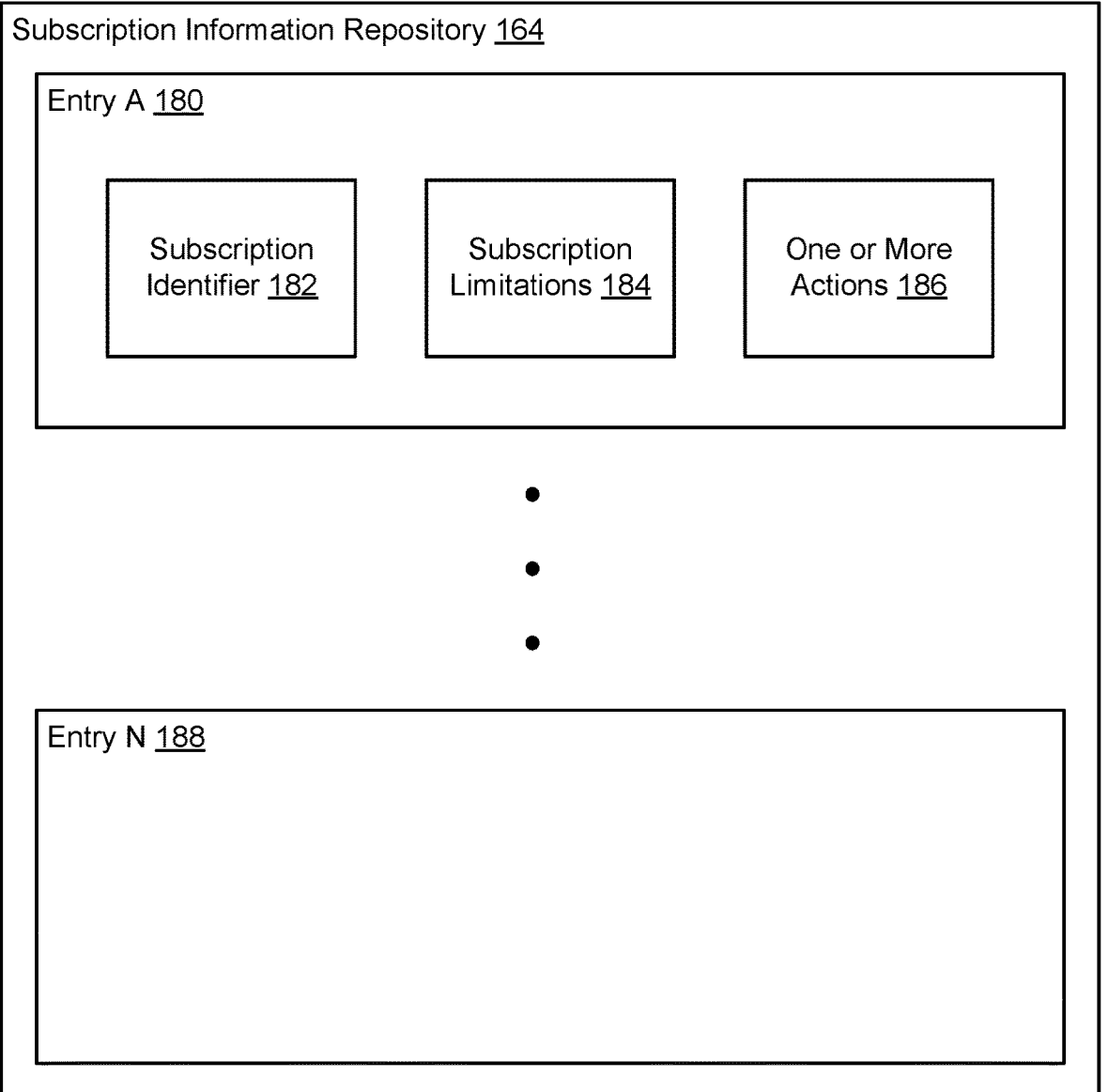
FIG. 1D shows a block diagram illustrating a subscription information repository in accordance with an embodiment.
Figure 1E:
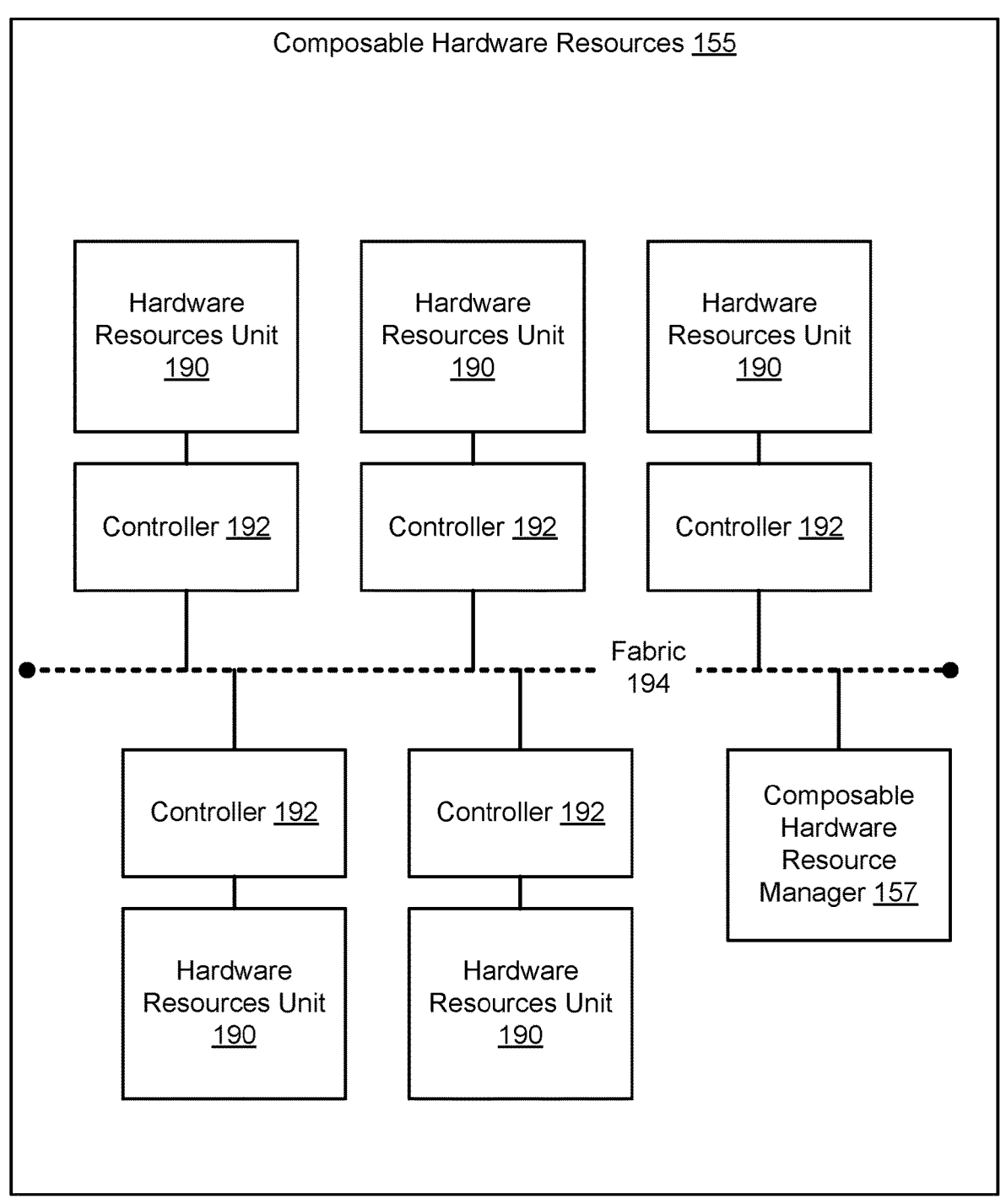
FIG. 1E shows a block diagram illustrating composable hardware resources in accordance with an embodiment.

In an embodiment, hardware resources 156 include composable resources. Composable resources may include any type and quantity of hardware devices that may be dynamically interconnected with one another to form bare metal systems as composed systems. To facilitate composition, the composable resources may be grouped in a manner that allows for presentation of various groupings (e.g., portions) as bare metal resources to other groupings. Refer to FIG. 1E for additional details regarding composable resources.

Composable hardware resource manager 157 may provide composition services for composable resources of hardware resources 156. The composition services services may include instantiating various bare metal systems using the composable hardware resources, loading software onto the composed resources, beginning operation of the composed bare metal systems, and/or retiring composed bare metal systems. Composable hardware resource manager 157 may do so based on information obtained from local subscription manager 158. For example, local subscription manager 158 may provide information regarding the quantity and characteristics (e.g., hardware/software components, capabilities, etc.) of composed systems to be usable by a user of managed system 150. Composable hardware resources manager 157 may instantiate, operate, and retire composed systems based on the aforementioned information.

In an embodiment, composable hardware resource manager 157 is implemented using a hardware device including circuitry. The hardware device may be, for example, a digital signal processor, a field programmable gate array, or an application specific integrated circuit. The circuitry may be adapted to cause the hardware device to perform the functionality of composable hardware resource manager 157. Composable hardware resource manager 157 may be implemented using other types of hardware devices without departing embodiment disclosed herein.

In an embodiment, composable hardware resource manager 157 is implemented using a processor adapted to execute computing code stored on a persistent storage that when executed by the processor performs the functionality of composable hardware resource manager 157 discussed throughout this application. The processor may be a hardware processor including circuitry such as, for example, a central processing unit, a processing core, or a microcontroller. The processor may be other types of hardware devices for processing information without departing embodiment disclosed herein.

Local subscription manager 158 may provide subscription management services. Subscription management services may include (i) obtaining information regarding subscriptions, (ii) performing one or more actions to implement the subscriptions, (iii) storing information regarding the subscriptions in a location accessible to local subscription manager 158, (iv) monitoring operation of managed system 150 based on subscription information (e.g., specified by the information regarding the subscriptions), and (v) based on the monitoring, performing one or more actions to force managed system 150 to comply with the subscriptions (or lack thereof) once managed system 150 may in the future and/or is currently exceeding one or more subscription limitations. The one or more actions to implement the subscriptions may include, for example, (a) instantiating a composed system (e.g., by sending information regarding the characteristics of the composed system to composable hardware resource manager 157), (b) loading various information into storage and/or memory of the instantiated composed system, (c) beginning operation of the instantiated composed system, (d) notifying subscription management service 10 of the instantiated compose system (e.g., so that users may be presented with the newly instantiated composed system), (e) retiring composed systems (e.g., when subscriptions are terminated/end), and/or (f) any other types of actions to implement changes to composed system to comply with subscriptions. When doing so, local subscription manager 158 may send messages to composable hardware resource manager 157 (or use other means for communicating hardware component powering information) to invoke its functionality to selectively instantiate composed systems using hardware resources 156 and/or retire composed systems (e.g., thereby freeing portions of hardware resources 156).

By providing its functionality, local subscription manager 158 may manage the configuration, behavior, and/or functionality of managed system 150 in a manner that automatically conforms it to match that expected by subscription management service 10. As part of the aforementioned process, local subscription manager 158 and subscription management service 10 may cooperate to enforce subscriptions on managed system 150 through instantiation, operation, and/or retirement of composed systems. Local subscription manager 158 and subscription management service 10 may also perform one or more authentications of one another and/or communications from these components to prevent other entities from interfering with the cooperative operation of local subscription manager 158 and subscription management service 10.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller (e.g., such as a chassis manager for a chassis in which hardware resources 156 are positioned). The out of band management controller may be hosted by managed system 150, be operably connected to hardware resources 156 (e.g., via interconnect 610, shown in FIG. 6), and may operate independently from other components (e.g., hardware and software) of managed system 150. The management controller may include functionality to manage the operation, configuration, and/or other characteristic of any hardware and/or software component of managed system 150. For example, the management controller may include functionality to invoke the functionality of composable hardware resources manager 157 thereby instantiating composed system and/or retiring composed systems.

In an embodiment, the management controller includes a separate communication interface (e.g., from that of a communication interface of managed system 150) through which it communicates with subscription management service 10. In an embodiment, the management controller uses the same communication interface which managed system 150 uses to communicate with other devices. Either of these communication interface may facilitate communications with communication system 30, and devices connected to communication system 30 such as subscription management service 10.

When providing its functionality, local subscription manager 158 may perform all, or a portion, of the methods and operations illustrated in FIGS. 2-5. Refer to FIG. 1C for additional details regarding local subscription manager 158.

While illustrated in FIG. 1B with a limited number of specific components, a managed system may include additional, fewer, and/or different components without departing from embodiments disclosed herein.

Turning to FIG. 1C, a block diagram of local subscription manager 158 in accordance with an embodiment is shown. Local subscription manager 158 may be implemented with a computing device similar to that illustrated in FIG. 6. In addition (and/or alternatively) to any of the components shown in FIG. 6, local subscription manager 158 may include hardware resource manager 160 and storage 162. Each of these components is discussed below.

Hardware resource manager 160 may include functionality to (i) establish secure connections with and/or authenticate subscription management service 10, (ii) obtain information from subscription management service 10 via the secure connections, (iii) update subscription information repository 164 and/or action repository 166 based on the obtained information, and (iv) modify the configuration, function, and/or operation of a device that hosts local subscription manager 158 to conform to the information stored in subscription information repository 164 and/or action repository 166. To modify the configuration, function, and/or operation of a host managed system, hardware resource manager 160 may invoke the functionality of a composable hardware resource manager (e.g., by sending it communications with instructions) to selectively instantiate and/or retire composed systems. Doing so, may limit or expand the hardware resources available for use by a user of the host managed system in a manner that complies with the information in subscription information repository 164.

In an embodiment, hardware resource manager 160 is implemented using a hardware device including circuitry. The hardware device may be, for example, a digital signal processor, a field programmable gate array, or an application specific integrated circuit. The circuitry may be adapted to cause the hardware device to perform the functionality of hardware resource manager 160. Hardware resource manager 160 may be implemented using other types of hardware devices without departing embodiment disclosed herein.

In one embodiment, hardware resource manager 160 is implemented using a processor adapted to execute computing code stored on a persistent storage that when executed by the processor performs the functionality of hardware resource manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164 and action repository 166.

Subscription information repository 164 may be implemented with one or more data structures that store information regarding subscriptions for a device that hosts local subscription manager 158. Refer to FIG. 1D for additional details regarding subscription information repository 164.

Action repository 166 may be implemented with one or more data structures that store information regarding actions that may be performed to force a managed system hosting local subscription manager 158 to comply with various subscriptions. The actions may, for example, be keyed to information in subscription information repository 164 such that corresponding actions from action repository 166 may be identified. Actions from action repository 166 may be performed by hardware resource manager 160 when a condition is met, such as a subscription limit being exceeded.

In an embodiment, action repository 166 includes at least one set of actions keyed to additions and/or removals of subscriptions for a host managed system. The actions may include (i) instantiating a new composed system, and (ii)

retiring a composed system. In this manner, various hardware resources that are outside of subscriptions of a user of the host managed system may be screened from use by users of the host managed system (e.g., because hardware resources not allocated to a composed system may be inaccessible to users of the host managed system).

While various data structures have been illustrated and described in FIG. 1C, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1C may be stored remotely to local subscription manager 158 (e.g., in a storage of a host device, a cloud resource, etc.) in a manner that is still accessible to local subscription manager 158.

While illustrated in FIG. 1C with a limited number of specific components, a local subscription manager may include additional, fewer, and/or different components without departing from embodiments disclosed herein.

Turning to FIG. 1D, a diagram of subscription information repository 164 in accordance with an embodiment is shown. When information regarding subscriptions is obtained by a local subscription manager, subscription information repository 164 may be updated to reflect the information. For example, the local subscription manager may (if the information so indicates) perform actions to modify a host device (e.g., adding or removing functionality, access to various components, etc.) and add information to subscription information repository 164 such that limitations on a subscription may be identified and changes to implement the subscription reverted upon subscription limits being exceeded.

Subscription information repository 164 may include any number of entries 180, 188. Each of entries 180, 188 may correspond to a different current subscription. Each of entries 180, 188 may include a subscription identifier 182, subscription limitations 184, and one or more actions 186.

Subscription identifier 182 may identify to which subscription an entry corresponds. For example, subscription identifier 182 may be implemented with numerical identifiers (e.g., 1, 2, 3 . . . ). These integers may correspond with similar information maintained by the subscription management service such that common entries associated with the same subscription may be easily identifiable.

Subscription limitations 184 may specify one or more limitations (if any exist, in some cases no limitations may exist if a feature/function/component is enabled forever without limitation) regarding a subscription identified by subscription identifier 182. Subscription limitations 184 may specify, for example, time limits, expiration points in time, operational use limits (e.g., such as numbers of operations a graphic processor, accelerator, or other device may perform), and/or other information regarding limits on a subscription. Different subscriptions may have different subscription limitations (e.g., may expire at different times). The operation of a host managed system may be compared to the information in subscription limitations 184 to ascertain whether a subscription limitation has been exceeded.

One or more actions 186 may specify actions to be performed upon a subscription limit specified by subscription limitations 184 being exceeded. The actions may include, for example, retiring one or more composed systems corresponding to a subscription.

Subscription information repository 164 may include any number of entries, with each entry specifying similar and/or different information.

Like the information in subscription information repository 164, a subscription management service may store similar information. However, in addition to the information included in the entries shown in FIG. 1D, the information stored by the subscription management service may include two different sets of one or more actions. A first set of the one or more actions may cause (when the first set of actions are performed) one or more composed systems to be instantiated, configured (e.g., loading software), and being operation. A second set of the one or more actions may cause (when the second set of actions are performed) one or more composed systems (e.g., previously instated for a corresponding subscription) to be retired, with the allocated hardware components of the retired one or more composed systems being released for use by other composes systems.

Turning to FIG. 1E, a diagram of composable hardware resources 155 in accordance with an embodiment is shown. Composable hardware resources 155 may be a portion (or all of) hardware resources 156. Composable hardware resources 155 may be dynamically allocated to form composed systems, and released for reuse when a composed system is retired.

To provide its functionality, composable hardware resources 155 may include any number of hardware resources unit 190, any number of controller 192, and any number of fabric 194.

Hardware resources unit 190 may be an aggregation of hardware components operably connected to one another as bare metal resources. In an embodiment, different hardware resources units may include different hardware components to perform different functions. For example, a first hardware resources unit may include resources to provide for computation such as processors, memory modules, etc. In contrast, a second hardware resources unit may include storage devices and a storage controller to provide storage. Composable hardware resources 155 may include any number of hardware resources unit 190, which each may perform similar or different computation functionalities (e.g., compute, storage, etc.).

To form composable systems, any of hardware resources unit 190 may be managed by a corresponding controller 192. Controller 192 may mediate presentation of the corresponding hardware resource unit 190 as bare metal resources to other hardware resource units. For example, a controller may be operably connected as a bare metal resource to a hardware resource unit. The controller may implement any number of layers of abstraction (e.g., virtualization, translation, communication encapsulation, etc.) to present what appears, to the hardware resource unit, to be a bare metal interface to one or more other hardware resource units. Consequently, the hardware resource unit may include any number of convention hardware components that operate in a conventional manner consistent with bare metal interfacing to other hardware components of other hardware resource units.

For example, consider a scenario where a controller is tasked with presenting a first storage hardware resources unit to a compute hardware resources unit to instantiate a composed system that includes both compute a storage functionality. To do so, the controller may virtualize the functionality of the storage hardware resources unit, allocate a portion of the virtualized storage resources to the compute hardware resources unit, establish a communication path/connection (e.g., via fabric 194) between the storage hardware resources unit and the compute hardware resources unit, and generate a translation table such that the various communications from the storage hardware resources unit appear, to the compute hardware resources unit, as a storage device operably connected to it via a bare metal interface. By doing so, various types of hardware resources units may be operably connected to one another without having any of the hardware resources units perform any special process- ing, implement various virtualization or abstraction layers, etc.

In an embodiment, controller 192 provide their function- alities under the direction of composable hardware resource manager 157. For example, composable hardware resource manager 157 may inform controller 192 of which hardware resources units (or portions thereof) are to be presented to other hardware resources units.

In an embodiment, controller 192 is implemented using a hardware device including circuitry. The hardware device may be, for example, a digital signal processor, a field programmable gate array, or an application specific inte- grated circuit. The circuitry may be adapted to cause the hardware device to perform the functionality of controller 192. Controller 192 may be implemented using other types of hardware devices without departing embodiment dis- closed herein.

In one embodiment, controller 192 is implemented using a processor adapted to execute computing code stored on a persistent storage that when executed by the processor performs the functionality of controller 192 discussed throughout this application. The processor may be a hard- ware processor including circuitry such as, for example, a central processing unit, a processing core, or a microcon- troller. The processor may be other types of hardware devices for processing information without departing embodiment disclosed herein.

In an embodiment, controller 192 is implemented using a smart network interface controller.

In an embodiment, controller 192 is implemented with a system control processor.

In an embodiment, any of hardware resources unit 190 and controller 192 are implemented using sleds of a chassis. For example, various hardware resource unit 190 may be positioned in a corresponding sled, which may be housed in a chassis.

In an embodiment, fabric 194 provide operable connec- tivity between any number of hardware resource units and/or controller. Fabric 194 may be implemented with, for example Non-Volatile Memory Express over Fabric (NVMeOF), an ethernet network, one or more peripheral component interconnect links, one or more serial ATA (e.g., AT attachment) interfaces, and/or any other type of com- munication architecture. Any of controller 192 and compos- able hardware resource manager 157 may communicate with one another via fabric 194. In FIG. 1E, fabric 194 is illustrated using the dashed line terminating in filler, circular elements.

While illustrated in FIG. 1E with a limited number of specific components, composable hardware resources 155 may include additional, fewer, and/or different components without departing from embodiments disclosed herein.

While FIGS. 1A-1E have been illustrated using blocks representing different entities, the functionality (all, or a portion) of any of these entities may be combined with any of the other illustrated entities. Likewise, the functionality (all, or a portion) of any of these entities may be divided across any number entities (e.g., in addition to those illus- trated in and/or described with respect to these figures).

Figure 2:
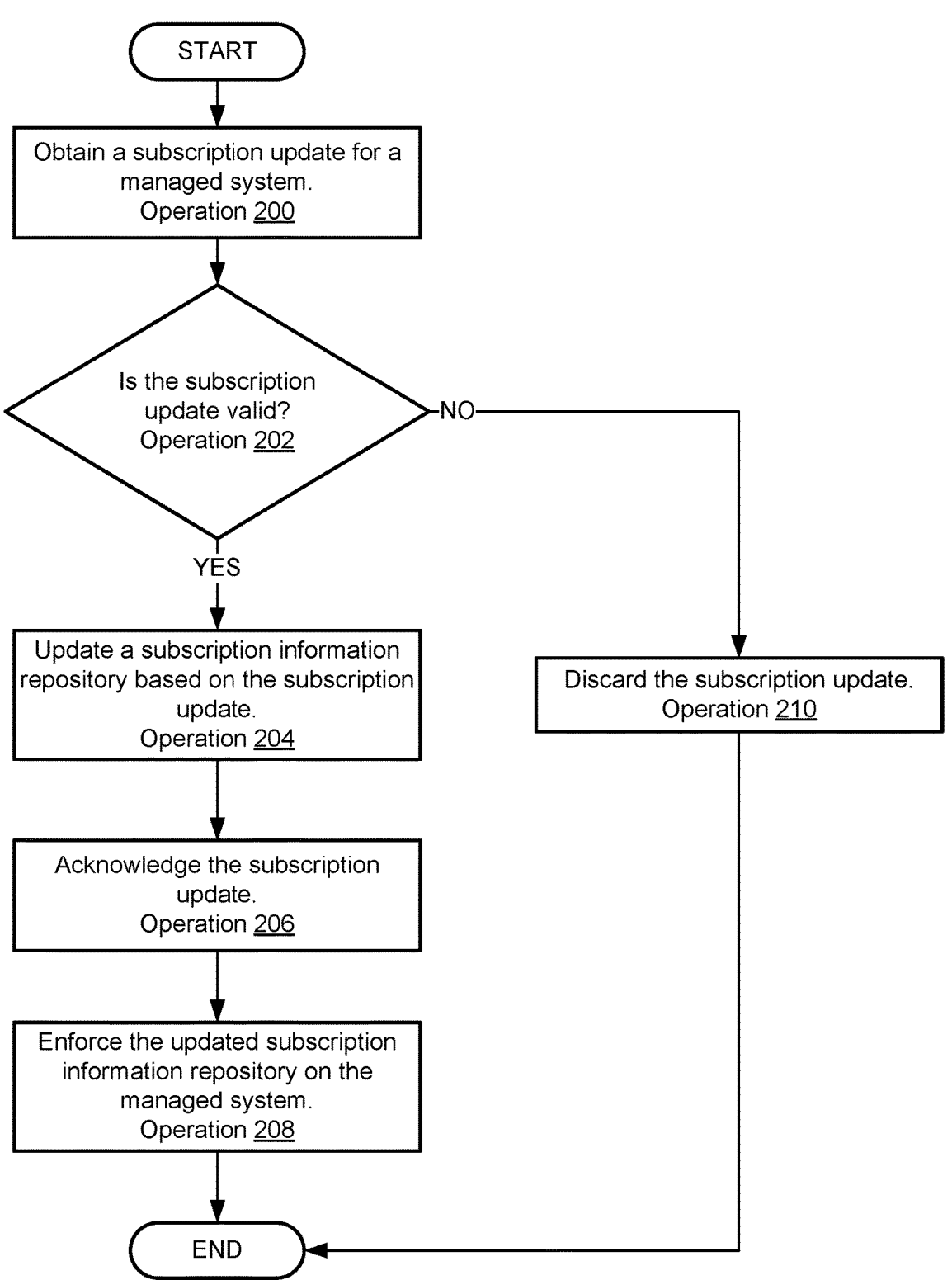
FIG. 2 shows a flow diagram illustrating a method of processing a subscription update in accordance with an embodiment.
Figure 3:
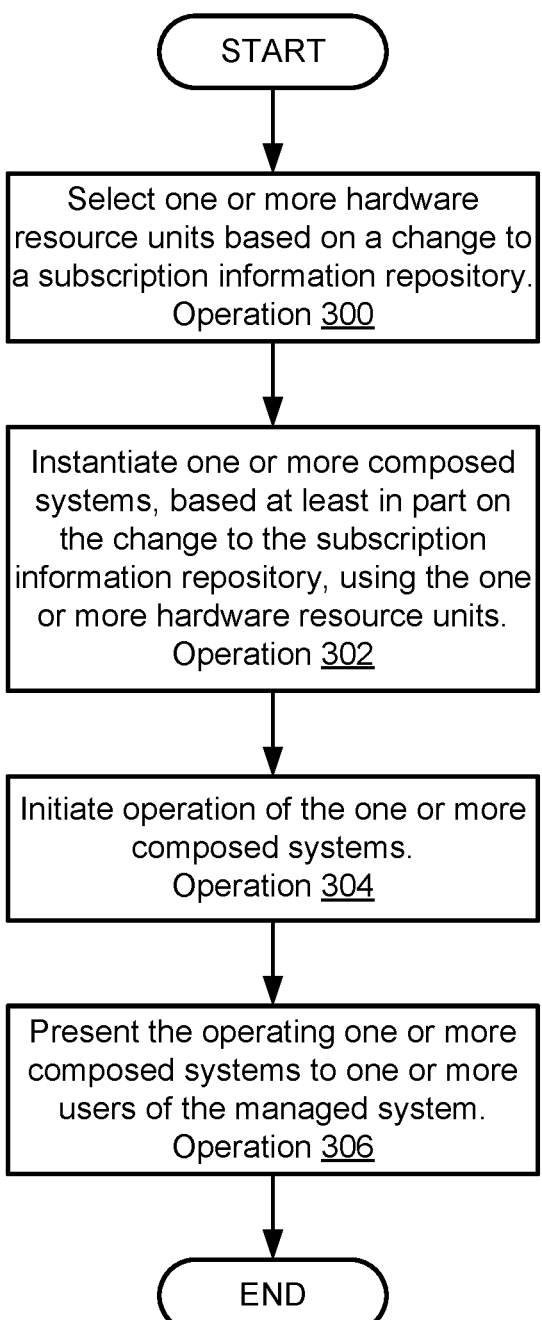
FIG. 3 shows a flow diagram illustrating a method of enforcing subscriptions on a managed system in accordance with an embodiment.

As discussed above, the components of FIG. 1A may perform various methods to provide computer implemented services using managed systems. FIGS. 2-3 illustrate examples of methods that may be performed by the com- ponents of FIG. 1A. For example, a local subscription manager of a managed system may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of processing a subscription update in accordance with an embodiment is shown. The method illustrated in FIG. 2 may be performed when a person changes a subscription asso- ciated with a managed system. For example, the person may utilize the subscription management service 10 to add a new subscription for a managed system to modify the operation of the managed system. Doing so may prompt the subscrip- tion management service 10 to generate and provide the subscription update to the managed system.

At operation 200, a subscription update for a managed system is obtained from a subscription management service. The subscription update may be obtained by a local sub- scription manager. For example, the subscription update may be obtained by receiving it in a message from the subscription management service via a communication sys- tem. The subscription update may be obtained via other methods (e.g., public subscribe systems, pull rather than push, etc.) without departing from embodiments disclosed herein.

In an embodiment, the subscription update specifies (i) a subscription identifier, (ii) one or more subscription limita- tions, (iii) one or more subscription enablement actions (e.g., and/or identifiers usable to index to various actions in an action repository), and (iv) one or more subscription dis- ablement actions (e.g., and/or identifiers usable to index to various actions in an action repository).

At operation 202, it is determined whether the subscrip- tion update is valid. A subscription update may be consid- ered valid when it can be determined that a subscription management service (e.g., tasked with managing a host managed system which hosts a local subscription manager performing all, or some, of the method illustrated in FIG. 2) generated, provided, and/or otherwise originated the sub- scription update (e.g., and/or the contents of the subscription update can be authenticated). The determination may be made via any method without departing from embodiments disclosed herein.

For example, in an embodiment, the determination may be made by determining whether the subscription update includes authentication data (e.g., such as a bearer token) usable to ascertain whether the subscription update was originated by the subscription management service. If such information is included in, with, and/or otherwise associated with the subscription update, then the subscription update may be determined as being valid.

In another example, in an embodiment, the determination may be made by checking with the subscription manage- ment service. For example, the local subscription manager may establish a secure communication channel (e.g., via a public-private key exchange and negotiated session key for securing communications between these components) with the subscription management service through which infor- mation may be exchanged. The information may include, for example, portions of the subscription update, information derived from the subscription update, some authentication data in and/or associated with the subscription update, and/or other types of information usable by the subscription management service to determine whether it originated the subscription update. If the subscription management service determines that it originated the subscription update, then the subscription management service may determine that the subscription update is valid and notify the local subscription manager of the determination.

If it is determined that the subscription update is valid, then the method may proceed to operation 204. Otherwise, the method may proceed to operation 210 following operation 202.

At operation 204, a subscription information repository is updated based on the subscription update. The subscription information repository may be updated by, for example, adding a new entry indicating a new subscription, removing an entry indicating termination of a subscription, and/or modifying an entry indicating a change in the subscription. In this manner, the information included in subscription information repository may be updated to match those maintained by the subscription management service 10.

At operation 206, the subscription update is acknowledged. The subscription update may be acknowledged by, for example, sending a message (and/or using other mechanisms to provide information) to an entity (e.g., a subscription management service tasked with managed the host managed system) associated with the subscription update. The message may indicate, for example: (i) that the host managed system is in compliance with subscriptions maintained by the subscription management service, (ii) changes made to the operation of the host managed system to comply with the subscription update, (iii) any information indicating deviation or inability to comply with the subscription update, and/or (iv) other types of information usable by the subscription management service to manage the host managed system to comply with the subscriptions associated with the host managed system.

In an embodiment, the subscription update is acknowledged before the host managed system is placed into compliance with the subscription update even while the acknowledgement indicates that the host managed system is in compliance with the subscription update, and/or subscriptions maintained by a subscription management service. Thus, there may be a discrepancy between the operation of the host managed system and the subscriptions maintained by the subscription management service.

In an embodiment, the subscription update includes access information or other information usable to notify a user of the host managed system of the changed in resources available for use. For example, the information may include access information for a newly instantiated composed system or an notification that a previously instantiated composed system has been retired.

At operation 208, the updated subscription information repository is enforced on the host managed system. The updated subscription information repository may be enforced by, for example, instantiating and/or retiring composed system. To do so, the local subscription manager may provide a composable hardware resources manager with information indicating which composable hardware resources are to be allocated to a new composed system and/or which composed systems are to be retired.

In an embodiment, composable hardware resources not allocated to a composed system are not visible or otherwise usable by user of the host managed system, even though the composable hardware resources are present.

In an embodiment, the updated subscription information repository is enforced using the method illustrated in FIG. 3.

The updated subscription information repository may be enforced using other methods without departing from embodiments disclosed here.

The method may end following operation 208.

Returning to operation 202, the method may proceed to operation 210 following operation 202 when it is determined that the subscription update is not valid.

At operation 210, the subscription update is discarded. Consequently, the subscription information repository may not be updated. In this scenario, discarding the subscription update may keep the host managed system in compliance with subscriptions maintained by the subscription management service whereas implementing the subscription update may place it out of compliance (e.g., one or more hardware components may be in an undesired power state).

The method may end following operation 210.

Using the method illustrated in FIG. 2, a managed system may be placed in a state consistent with a subscription maintained by a subscription management service, and in a state where features added to the managed system may be removed or otherwise reverted automatically upon an occurrence of a subscription limitation being exceeded.

Turning to FIG. 3, a flow diagram illustrating a method of enforcing compliance with subscriptions in accordance with an embodiment is shown. The method may be performed, in part, by a local subscription manager that previously obtained information regarding a subscription (e.g., a subscription update) for a managed system hosting the local subscription manager.

At operation 300, one or more hardware resource units are selected based on a change to a subscription management repository. The hardware resource units may be selected to meet expectations set forth in a changed subscription. For example, the change may indicate the expectations (e.g., quantities of computing resources, storage resources, memory resources, etc.) for the changed subscription. The one or more hardware resources may be composable hardware resources that are not allocated to any composed system.

At operation 302, one or more composed systems are instantiated based, at least in part, on the change to the subscription information repository and using the selected one or more hardware resource units. To do so, controllers associated with the one or more hardware resources units may mediate presentation of corresponding hardware resources units to the other one or more hardware resource units.

A composable hardware resources manager may send instructions to the respective controllers to organize the resource presentation. Once so instructed, the composable hardware resource manager may store information regarding the composable hardware resources allocated to the instantiated one or more composed system.

The number of the one or more composed systems that are instantiated may be based on the change, which may directly specify the quantity of composed systems to be instantiated. Alternatively, the change may indirectly indicate the quantity of the composed systems (e.g., the change may specify a goal rather than the specific instantiations to achieve a goal) to be instantiated.

In some embodiment, instantiating the one or more composed systems may include recomposing existing composed systems. For example, if insufficient hardware resource units are unavailable for allocation to instantiate the one or more composed systems, the existing composed system may be reviewed for excess resource allocations. If any are identified, the existing composed systems may be recomposed to remove the excess resource allocations thereby freeing additional hardware resource units for allocation to the one or more composed systems.

At operation 304, operation of the one or more composed systems is initiated. The operation may be initiated by, for example, loading various applications onto the one or more composed system and initiating execution of the applications. For example, various images may be stored in persistent storage of the one or more composed systems and computer instructions from the images may be loaded into memory and processed by a processor of the one or more composed systems to initiate operation. In some embodiments, the aforementioned process may result in a startup of the one or more composed systems, as discussed above, which may result in the operation of the composed systems being handed off to various operation managers such as operating systems.

At operation 306, the operating one or more composed systems are presented to one or more users of the managed system. The one or more composed systems may be presented through any mechanism such as, for example, notification of the users by the subscription management service, notification of management systems employed by the users of the managed system, and/or via other mechanisms. The method may end following operation 306.

Using the methods illustrated in and described with respect to FIGS. 2-3, embodiments disclosed herein may allow for the dynamic management of resources. The resources may be dynamically managed through instanton and retirement of composed systems that selectively present portions of the resources of managed systems in accordance with various subscriptions.

To further clarify embodiments disclosed herein, block diagrams of a system similar to that of FIG. 1A are illustrated in and described with respect to FIGS. 4A-4I. The figures may represent the operation of the system over time.

Figure 4A:
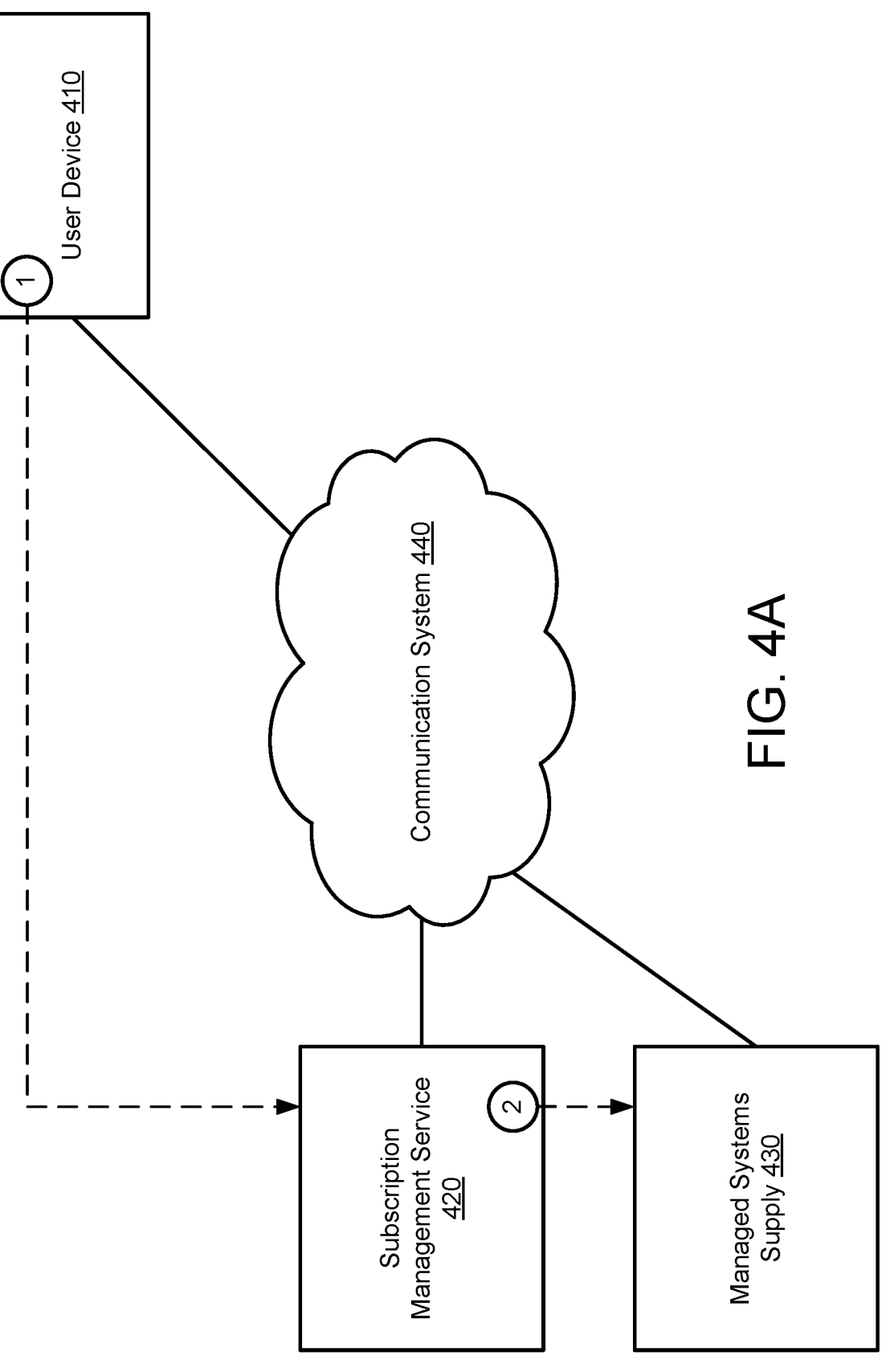
FIGS. 4A-4I show diagrams illustrating interactions between and actions of components of a system in accordance with an embodiment.

Turning to FIG. 4A, example actions and interactions between user device 410, subscription management service 420, and managed systems supply 430 (each of which may be operably connected by communication system 440) in accordance with an embodiment are shown. Like named components in FIG. 4A and FIG. 1A may be similar.

Now, consider a scenario where the user of user device 410 identifies that a new type of computer implemented services are to be provided to various users of an organization. In response to the determination, at block 1, the user may utilize user device 410 to send a request to subscription management service 420 for a managed system capable of providing the computer implemented services. Based on the request, at block 2, subscription management service 420 selects a managed system that has at least the quantity of hardware resources necessary to meet the needs of the computer implemented services specified by the user. Once selected, managed systems supply 430 (e.g., a logistics system that manages shipping of various managed systems to various locations, such as at a client site) prepares and sends the managed system.

While the selected managed system has all of the hardware resources necessary to meet the user's computer implemented services, the selected managed systems include additional hardware resources beyond those necessary for the computer implemented services. To meet cost goals, subscription management service 420 selects a subscription that results in these excess hardware resources not being available for use by the user and organization.

Figure 4B:
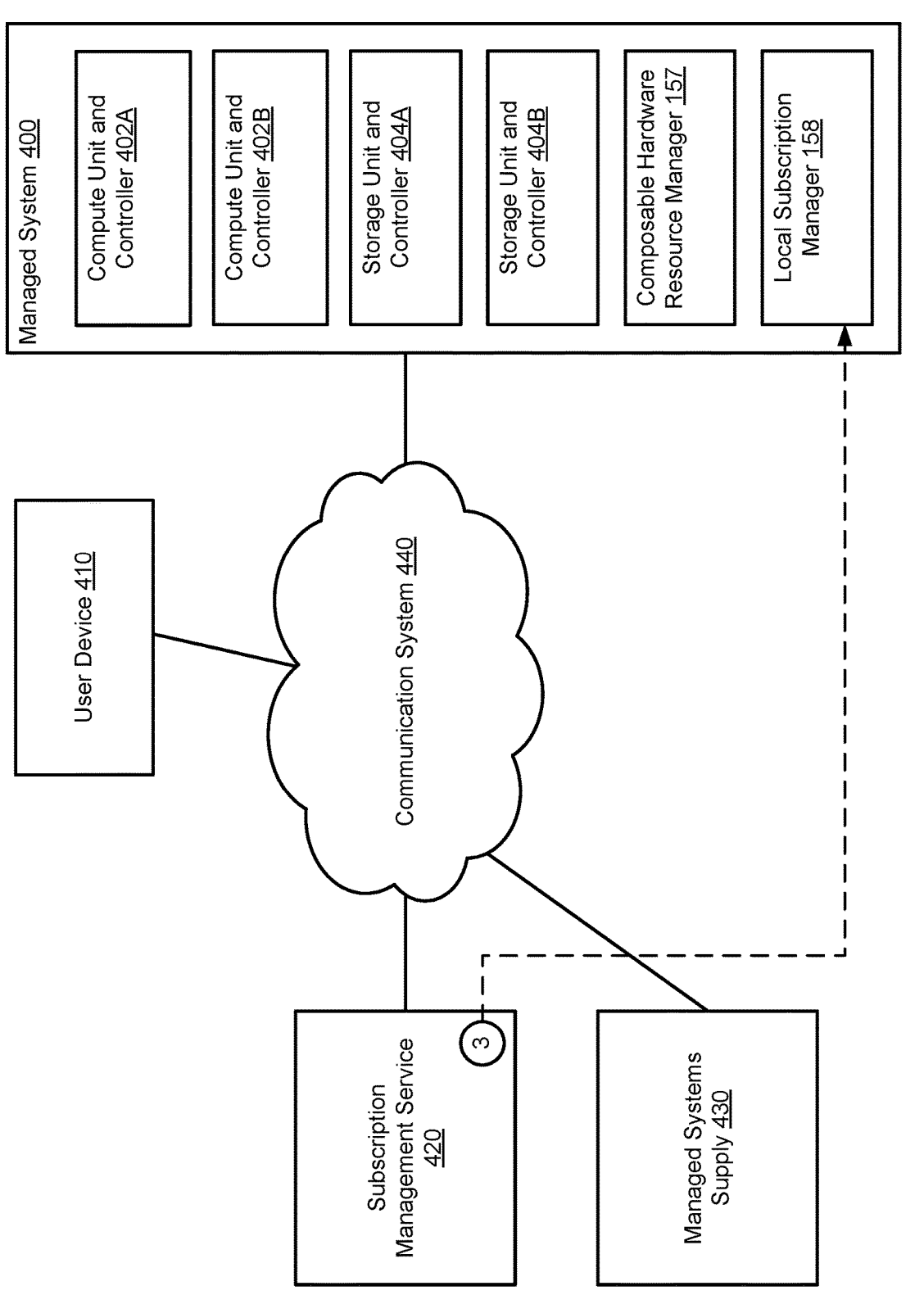

For example, turning to FIG. 4B, managed system 400 may be provided which includes multiple compute units with controllers 402A, 402; and multiple storage units with controllers 404A, 404B. Each of these units (e.g., 190) and controllers (e.g., 192) may be similar to that illustrated in FIG. 1E.

As discussed above, to meet cost goals, subscription management service 420 may have established a subscription for managed system 400. To implement the subscriptions, at block 3, subscription management service 420 may send a subscription update to local subscription manager 158.

Figure 4C:
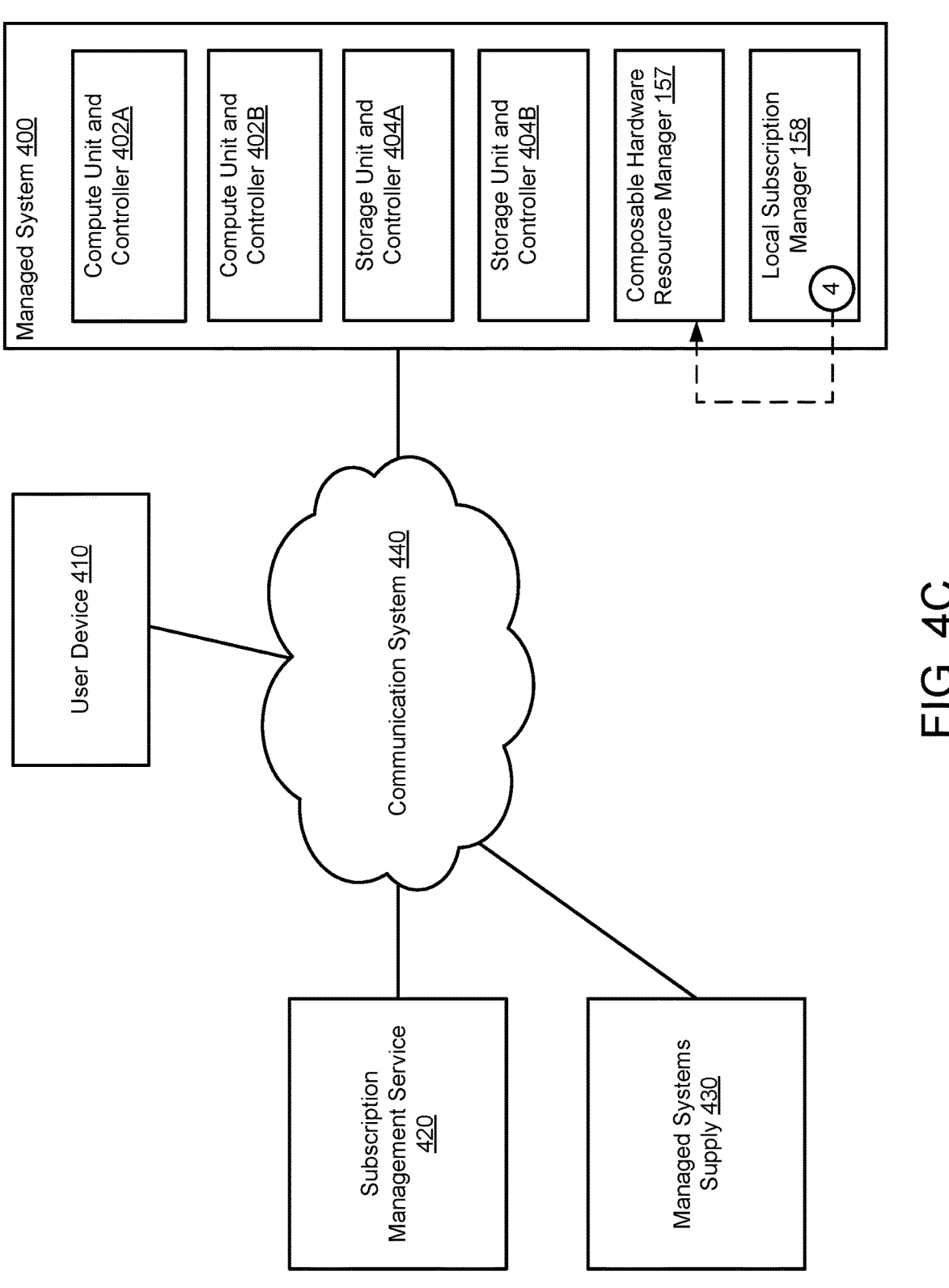

Based on the subscription update, turning to FIG. 4C, at block 4, local subscription manager 158 (*i*) identifies that only one compute unit and one storage unit are to be made accessible to users of managed system 400, and (ii) informs composable hardware resource manager 157 of the aforementioned allocation.

Figure 4D:
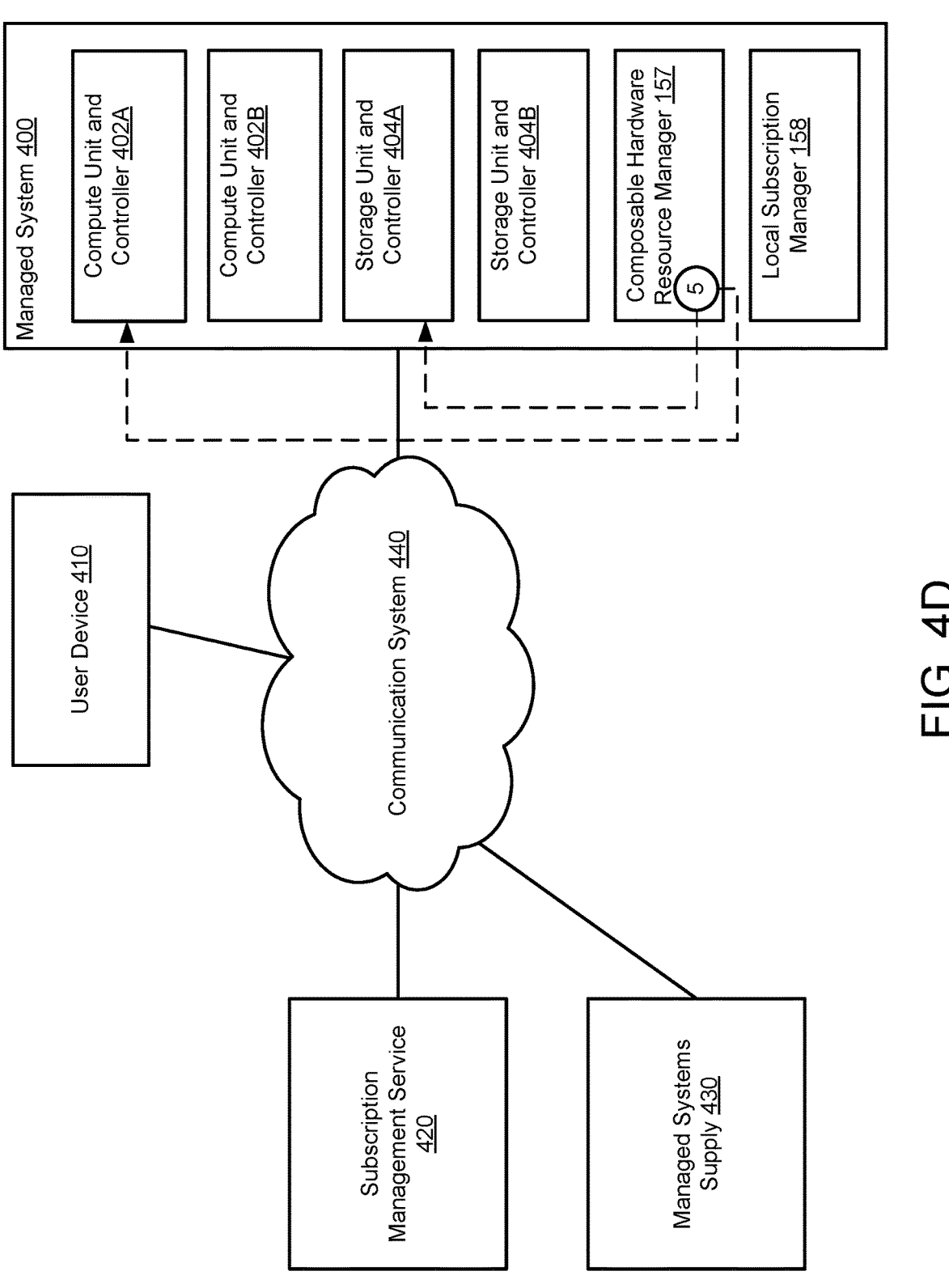
Figure 4E:
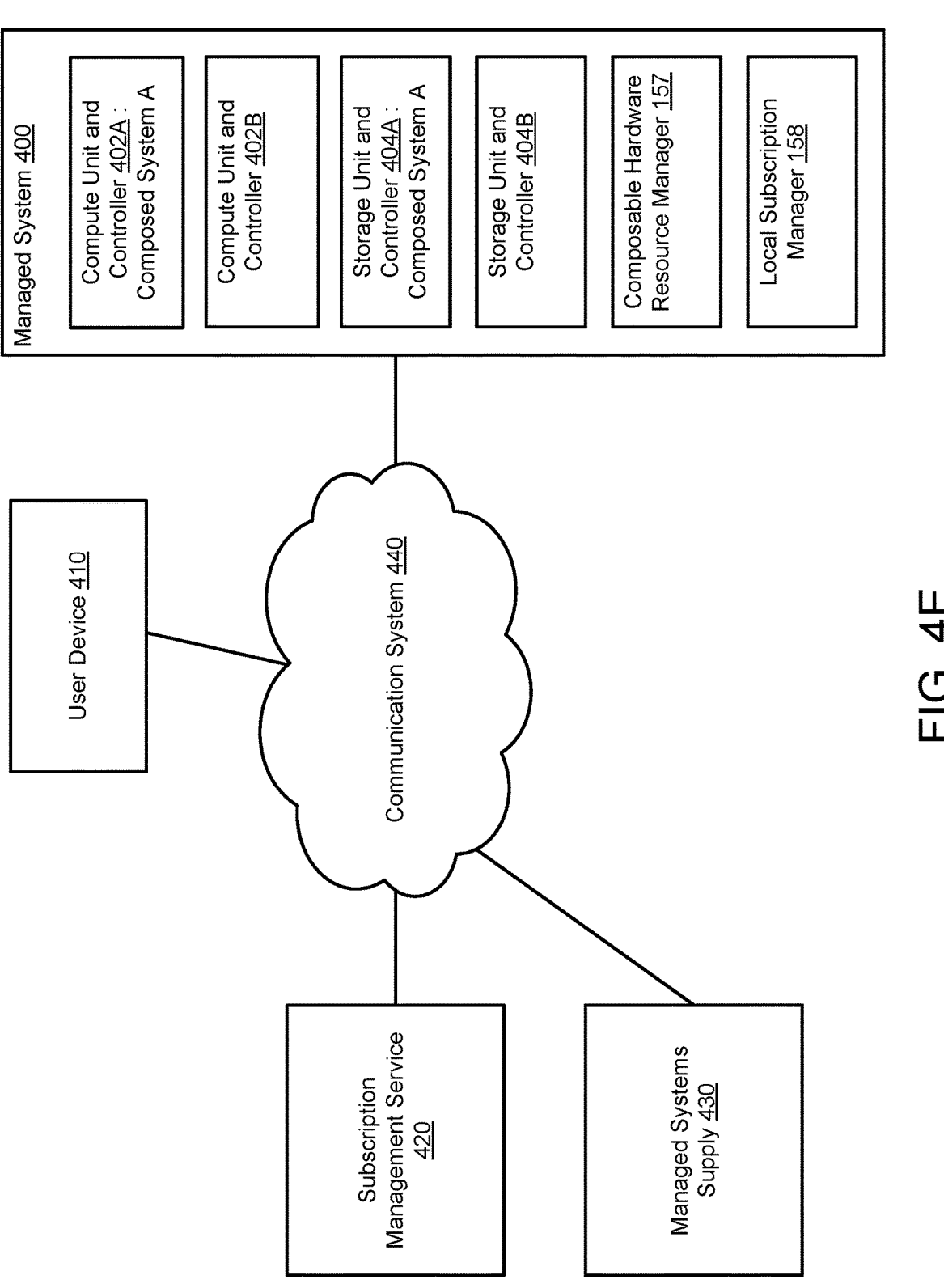

In response to being informed of the allocation, turning to FIG. 4D, at block 5, composable hardware resources manager 157 instructs the controllers of compute unit and controller 402A and storage unit and controller 404A to form a composed system. To do so, the respectively controllers form an operable connection between them, and mediate presentation of the compute unit and storage unit to each other as bare metal resources. Software may then be loaded and operation of the instantiated composed system A, as shown in FIG. 4E, may begin.

Once operation of composed system A begins, users may begin to utilize the computer implemented services. Over time, the quantity of consumers of the computer implemented services may increase resulting in the computer implemented services provided by composed system A being less desirable (e.g., delayed, sluggish, etc.).

Figure 4F:
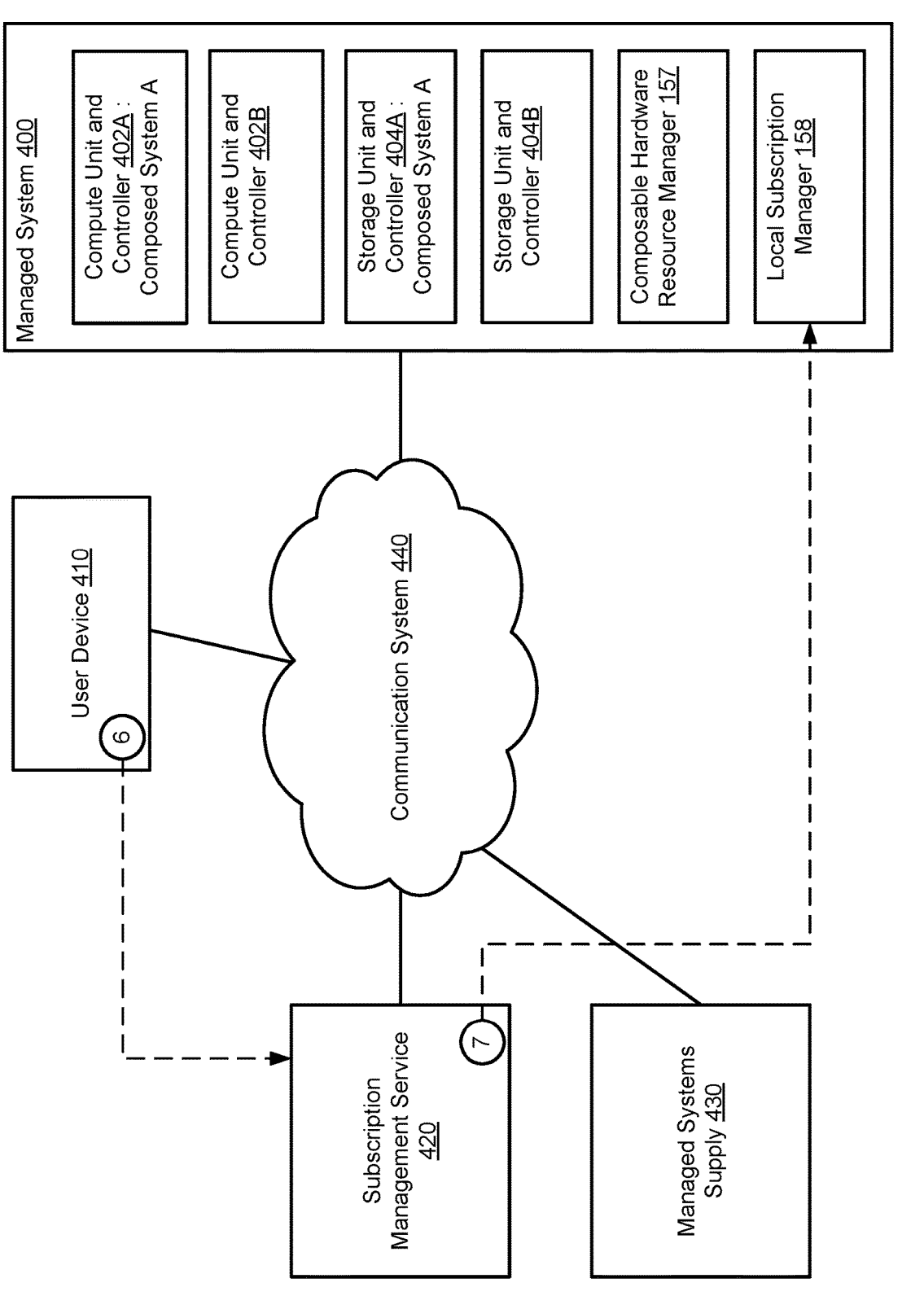

Turning to FIG. 4F, to improve the desirability of the computer implemented services, at block 6, requests that additional resources be made available for the computer implemented services. In response, at block 7, subscription management service 420 establishes an additional subscription for the user. The additional subscription includes compute unit and controller 402B and storage unit and controller 404b (which are both currently unavailable to the user because neither are allocated to a composed system accessible to the user). Subscription management service 420 sends a subscription update to local subscription manager 158 reflecting the change in subscription.

Figure 4G:
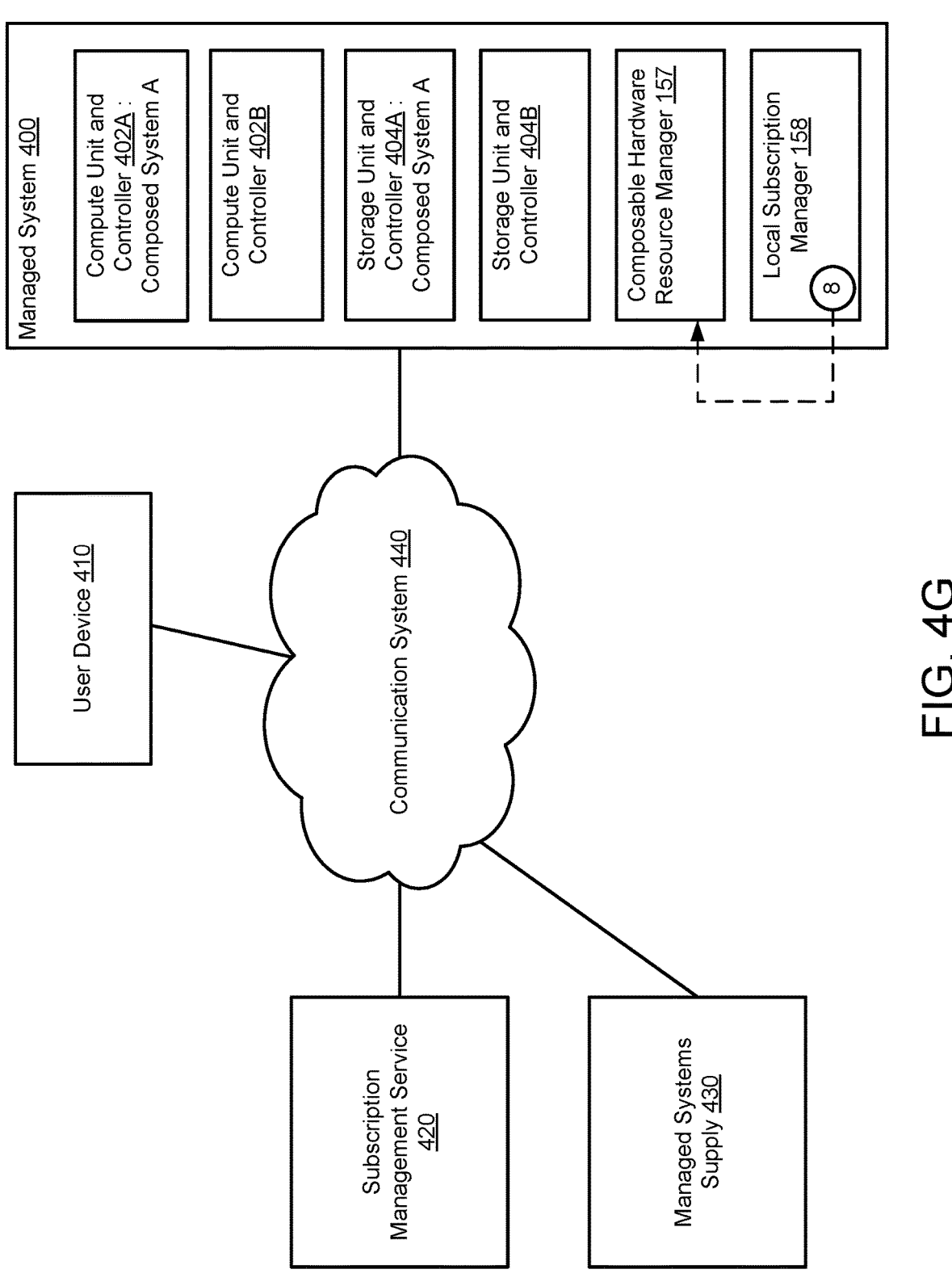

Turning to FIG. 4G, in response to receiving the subscription update, at block 8, local subscription manager 158 (*i*) identifies that the other compute unit and the other storage unit are to be made accessible to users of managed system 400, and (ii) informs composable hardware resource manager 157 of the aforementioned allocation.

Figure 4H:
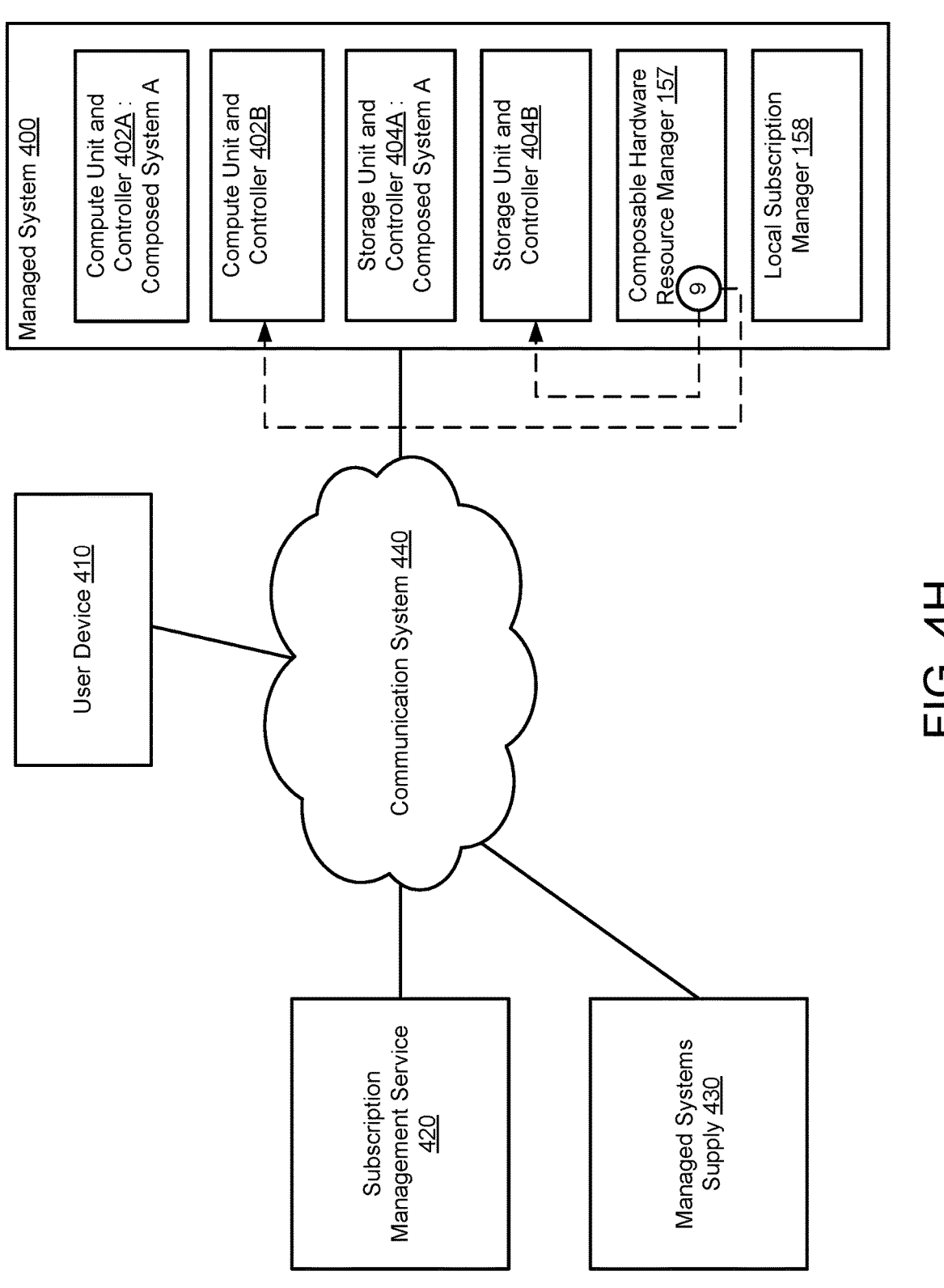
Figure 4I:
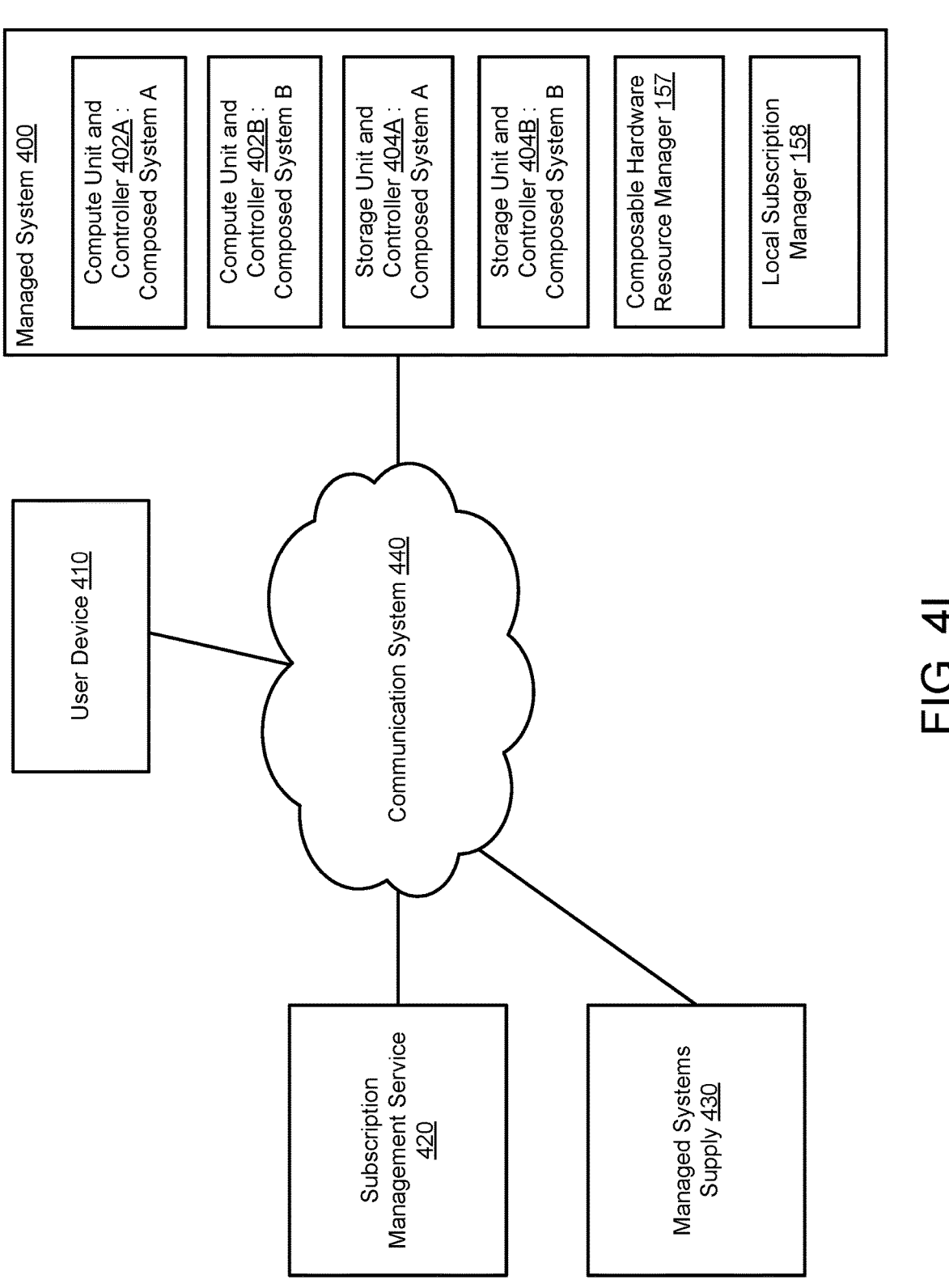

Turning to FIG. 4H, based on the notification, at block 9, composable hardware resources manager 157 instructs the controllers of compute unit and controller 402B and storage unit and controller 404B to form a second composed system. To do so, the respectively controllers form an operable connection between them, and mediate presentation of the compute unit and storage unit to each other as bare metal resources. Software may then be loaded and operation of the instantiated composed system B, as shown in FIG. 4I, may begin.

Thus, as illustrated in FIGS. 4A-4I, the disclosed embodiments may provide systems and methods for dynamic allocation and presentation of various resources to users based on corresponding subscriptions. In this manner, the quantity of resources available for a user may be dynamically changed over time. Accordingly, the users may be empowered to manage cost and capabilities over time.

As part of the aforementioned processes, various subscription updates may be received and processed by local subscription managers of the managed systems.

Figure 5:
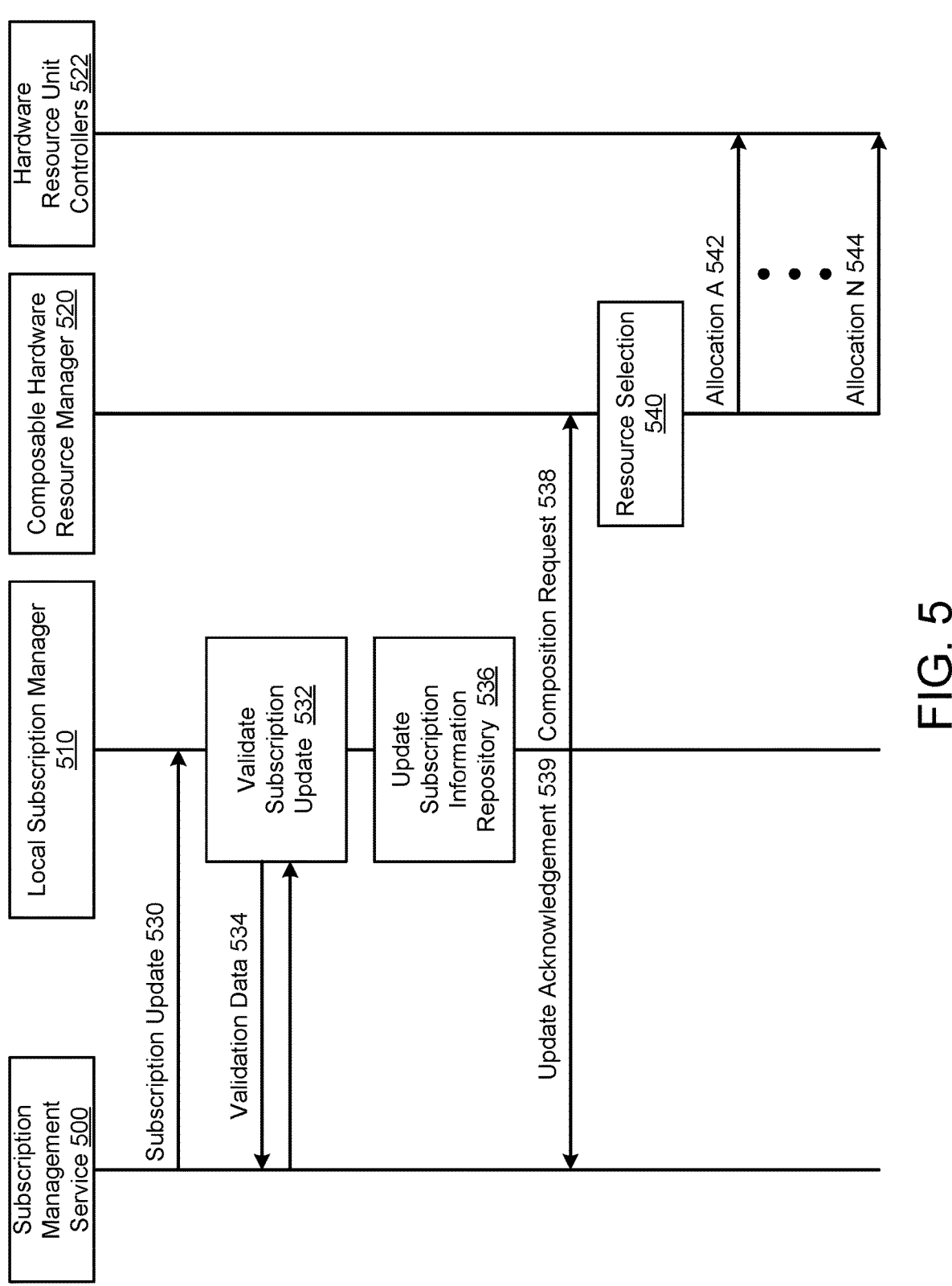
FIG. 5 shows a diagram illustrating interactions between and actions of components of a system in accordance with an embodiment.

Turning to FIG. 5, example actions and interactions between subscription management service 500, local subscription manager 510 of a host managed system (e.g., managed by subscription management service 500), composable hardware resource manager 520 (e.g., of the host managed system), and hardware resource unit controllers 522 in accordance with an embodiment are shown. Like named components in FIG. 5 and FIGS. 1A-lE may be similar.

In FIG. 5, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

At block 530, subscription management service 500 generates and provides a subscription update to local subscription manager 510. The update may be based on a request from a user or other source of change in subscription. In response, local subscription manager 510, at block 532, performs a validation of the subscription update. To do so, the local subscription manager 510 and subscription management service 500 may exchange validation data with each other, at block 534.

In this example scenario, the exchanged validation data establishes that the subscription update is valid. If it were not validated, local subscription manager 510 may discard the subscription update.

Once validated, local subscription manager 510, at block 536, updates subscription information repository based on the subscription update. Consequently, the updated subscription information repository may indicate that one or more hardware components of the host managed system that are to be presented to a user for use (and may not currently be presented to the user).

Once updated, local subscription manager 510, at block 538, generates and sends a composition request to composable hardware resource manager 520. Local subscription manager 510 may also send an update acknowledgement 539 to subscription management service 500.

In response to receiving the composition request, composable hardware resource manager 520 may select one or more hardware resource units at block 540, which when allocated to a composed system will present sufficient resources to the user to meet the specifications of the subscription update provided in block 530.

Based on the resource selection, composable hardware resource manager 520, at blocks 542-544, sends any number of allocation messages to hardware resource unit controllers 522 to cause the controllers to present, as bare metal resources, corresponding hardware resource units to one another such that one or more composed systems are instantiated.

Once instantiated, software may be loaded and operation of the composed systems may begin so that users are presented with all of the resources of a host managed system to which users are subscribed.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

As discussed above, various components may be implemented with computing devices. For example, any of the components illustrated in FIGS. 1A-5 may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/ logic 628 can be implemented in any combination hardware devices and software components.

Note that while system 600 is illustrated with various components of a data processing system, it is not intended to represent any particular architecture or manner of inter-connecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic repre-sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requir-ing physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com-puting device, that manipulates and transforms data repre-sented as physical (electronic) quantities within the com-puter system's registers and memories into other data similarly represented as physical quantities within the com-puter system memories or registers or other such informa-tion storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for operating a man-aged system, the method comprising:

obtaining, by a local subscription manager disposed inter-nally within a chassis of the managed system and from a subscription management service through a first com-munication interface of the local subscription manager, a subscription update for the managed system, the local subscription manager being a chassis manager of the managed system, and the first communication interface is separate and independent from a second communi-cation interface of the managed system that is used by the managed system to separately communicate with the subscription management service;

making a determination, by the local subscription man-ager, that the subscription update is a valid subscription update;

in response to the determination:

updating, by the local subscription manager, a subscrip-tion information repository based on the subscription update to obtain an updated one of the subscription information repository, the subscription information repository specifying composed systems that a user of the managed system can use; and applying, by the local subscription manager and using the updated one of the subscription information repository, the subscription update to the managed system, the applying comprises establishing digital and/or physical communication paths between hard-ware resource units installed within the managed system to provide at least one new composed system of the composed systems for the user of the managed system to use, the at least one new composed system being based on the subscription update and is com-posed of a portion of composable resources of the managed system, and the portion of the composable resources are made up of the hardware resource units, wherein applying the subscription update com-prises:

instantiating the new composed system using one or more controllers associated with the hardware resource units by at least presenting, using a first controller of the one or more controllers, a first hardware resource unit of the hardware resource units as bare metal resources to a second hardware resource unit of the hardware resource units, wherein presenting the first hardware resource unit as the bare metal resources comprises at least:

instantiating, using the first controller, a virtual-ization layer for the first hardware resource unit; and

allocating, using the first controller, a portion of computing resources of the first hardware resource unit to the second hardware resource unit.

2. The computer-implemented method of claim 1, wherein applying the subscription update using the updated subscription information repository further comprises:

initiating, before instantiating the new composed system, selection of the one or more of the hardware resource units based on the updating of the subscription information repository;

initiating, after instantiating the new composed system, operation of the new composed system; and providing, after the initiating of the operation of the new composed system, the new composed system to the user of the managed system for the user to use the new composed system.

3. The computer-implemented method of claim 2, wherein the first hardware resource unit and the second hardware resource unit are operably connected via a communication fabric.

4. The computer-implemented method of claim 3, wherein presenting the first hardware resource unit as the bare metal resources further comprises:

establishing, using the first controller and a second controller, a communication link between the first hardware resource unit and the second hardware resource unit, the communication link being part of the digital and/or physical communication paths; and presenting, using the second controller and the communication link, a synthetic bare metal interface for the first hardware resource unit to the second hardware resource unit.

5. The computer-implemented method of claim 1, wherein each of the hardware resource units is mediated by at least one controller among controllers of the managed system.

6. The computer-implemented method of claim 5, wherein the controllers are operably connected to one another via a fabric.

7. The computer-implemented method of claim 6, wherein the controllers are adapted to present the hardware resource units the bare metal resources to one another.

8. The computer-implemented method of claim 6, wherein the local subscription manager applies the subscription update on the managed system using the updated one of the subscription information repository by initiating transmission of one or more communications to the controllers that mediate the hardware resource units associated with the portion of the composable resources that make up the at least one new composed system, wherein the one or more communications are directed to unallocated portions of the composable resources.

9. The computer-implemented method of claim 5, wherein a first hardware resource unit of the hardware resource units is a compute unit and a second hardware resource unit of the of the hardware resource units is a storage unit.

10. The computer-implemented method of claim 9, wherein the first hardware resource unit and the second hardware resource unit are selected as a portion of computing resources for allocation to the at least one new composed system based on a unit type of the first hardware resource unit and the second hardware resource unit to provide both compute computing resources and storage computing resources to the at least one new composed system.

11. The computer-implemented method of claim 1, wherein the local subscription manager is implemented as a first physical computing device configured as an out of band management controller for the managed system, the out of band management controller being physically disposed within a second physical computing device configured as the managed system and operates independently from operations of the managed system, and the first physical computing device comprises a first processor and the second physical computing device comprises a second processor that is separate and operates independently from the first processor.

12. The computer-implemented method of claim 11, wherein the subscription information repository and the updated one of the subscription information repository is stored within a storage of the out of band management controller that is inaccessible to the managed system such that the managed system is unable to independently manage the subscription update and the subscription information repository without the out of band management controller.

13. A non-transitory machine-readable medium having instructions stored therein, which when executed by a processor, cause the processor to perform operations for operating a managed system, the operations comprising:

obtaining, by a local subscription manager disposed internally within a chassis of the managed system and from a subscription management service through a first communication interface of the local subscription manager, a subscription update for the managed system, the local subscription manager being a chassis manager of the managed system, and the first communication interface is separate and independent from a second communication interface of the managed system that is used by the managed system to separately communicate with the subscription management service;

making a determination that the subscription update is a valid subscription update;

in response to the determination:

updating, by the local subscription manager, a subscription information repository based on the subscription update to obtain an updated one of the subscription information repository, the subscription information repository specifying composed systems that a user of the managed system can use; and applying, by the local subscription manager and using the updated one of the subscription information repository, the subscription update to the managed system, the applying comprises establishing digital and/or physical communication paths between hardware resource units installed within the managed system to provide at least one new composed system of the composed systems for the user of the managed system to use, the at least one new composed system being based on the subscription update and is composed of a portion of composable resources of the managed system, and the portion of the composable resources are made up of the hardware resource units, wherein applying the subscription update comprises:

instantiating the new composed system using one or more controllers associated with the hardware resource units by at least presenting, using a first controller of the one or more controllers, a first hardware resource unit of the hardware resource units as bare metal resources to a second hardware resource unit of the hardware resource units, wherein presenting the first hardware resource unit as the bare metal resources comprises at least:

instantiating, using the first controller, a virtualization layer for the first hardware resource unit; and allocating, using the first controller, a portion of computing resources of the first hardware resource unit to the second hardware resource unit.

14. The non-transitory machine-readable medium of claim 13, wherein applying the subscription update using the updated subscription information repository further comprises:

initiating, before instantiating the new composed system, selection of the hardware resource units based on the updating of the subscription information repository;

initiating, after instantiating the new composed system, operation of the new composed system; and providing, after the initiating of the operation of the new composed system, the new composed system to the user of the managed system for the user to use the new composed system.

15. The non-transitory machine-readable medium of claim 14, wherein the first hardware resource unit and the second hardware resource unit are operably connected via a communication fabric.

16. The non-transitory machine-readable medium of claim 15, wherein presenting the first hardware resource unit as the bare metal resources further comprises:

establishing, using the first controller and a second controller, a communication link between the first hardware resource unit and the second hardware resource unit, the communication link being part of the digital and/or physical communication paths; and presenting, using the second controller and the communication link, a synthetic bare metal interface for the first hardware resource unit to the second hardware resource unit.

17. A managed system, comprising:

a processor; and a local subscription manager adapted to perform operations for managing operation of the managed system to comply with subscriptions, the local subscription manager being a chassis manager of the managed system, and the operations comprise:

obtaining, by a local subscription manager disposed internally within a chassis of the managed system and from a subscription management service through a first communication interface of the local subscription manager, a subscription update for the managed system, the local subscription manager being a chassis manager of the managed system, and the first communication interface is separate and independent from a second communication interface of the managed system that is used by the managed system to separately communicate with the subscription management service;

making a determination that the subscription update is a valid subscription update;

in response to the determination:

updating, by the local subscription manager, a subscription information repository based on the subscription update to obtain an updated one of the subscription information repository, the subscription information repository specifying composed systems that a user of the managed system can use; and applying, by the local subscription manager and using the updated one of the subscription information repository, the subscription update to the managed system, the applying comprises establishing digital and/or physical communication paths between hardware resource units installed within the managed system to provide at least one new composed system of the composed systems for the user of the managed system to use, the at least one new composed system being based on the subscription update and is composed of a portion of composable resources of the managed system, and the portion of the composable resources are made up of the hardware resource units, wherein applying the subscription update comprises:

instantiating the new composed system using one or more controllers associated with the hardware resource units by at least presenting, using a first controller of the one or more controllers, a first hardware resource unit of the hardware resource units as bare metal resources to a second hardware resource unit of the hardware resource units, wherein presenting the first hardware resource unit as the bare metal resources comprises at least:

instantiating, using the first controller, a virtualization layer for the first hardware resource unit; and allocating, using the first controller, a portion of computing resources of the first hardware resource unit to the second hardware resource unit.

18. The managed system of claim 17, wherein applying the subscription update using the updated subscription information repository further comprises:

initiating, before instantiating the new composed system, selection of the hardware resource units based on the updating of the subscription information repository;

initiating, after instantiating the new composed system, operation of the new composed system; and providing, after the initiating of the operation of the new composed system, the new composed system to the user of the managed system for the user to use the new composed system.

19. The managed system of claim 18, wherein the first hardware resource unit and the second hardware resource unit are operably connected via a communication fabric.

20. The method of claim 11, wherein the local subscription manager further comprises an action repository that stores actions that, when performed by the local subscription manager, causes the local subscription manager to force the managed system to comply with the subscriptions, and each of the actions in the action repository are keyed to at least one information stored in the subscription information repository.

* * * * *